(12) United States Patent
Kanazawa et al.

(10) Patent No.: US 6,922,204 B2
(45) Date of Patent: Jul. 26, 2005

(54) IMAGE DISPLAY MEDIUM AND IMAGE RECORDING APPARATUS

(75) Inventors: Masaharu Kanazawa, Suita (JP);
Keyaki Yogome, Kyoto (JP); Akihito Ikegawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 4 days.

(21) Appl. No.: 10/406,593

(22) Filed: Apr. 4, 2003

(65) Prior Publication Data

US 2003/0214567 A1 Nov. 20, 2003

(30) Foreign Application Priority Data

Apr. 5, 2002 (JP) .................................. 2002-104216

(51) Int. Cl.⁷ .............................. B41J 2/41; G11B 3/00; G09C 3/34
(52) U.S. Cl. ...................... 347/112; 347/153; 345/84; 345/107; 359/296
(58) Field of Search ............................. 347/112, 153; 345/84, 107; 359/296

(56) References Cited

U.S. PATENT DOCUMENTS

| | | | | |
|---|---|---|---|---|
| 5,708,453 A | * | 1/1998 | Tsuchida et al. ............... | 345/87 |
| 5,892,558 A | * | 4/1999 | Ge et al. ....................... | 349/43 |
| 5,920,299 A | * | 7/1999 | Ohshima et al. ............... | 345/88 |
| 5,982,346 A | * | 11/1999 | Sheridon et al. ............... | 345/85 |
| 6,184,856 B1 | * | 2/2001 | Gordon, II et al. .......... | 345/107 |
| 6,271,823 B1 | * | 8/2001 | Gordon et al. ............... | 345/107 |
| 6,323,989 B1 | * | 11/2001 | Jacobson et al. ........... | 359/296 |
| 6,333,754 B1 | | 12/2001 | Oba et al. | |
| 6,407,763 B1 | | 6/2002 | Yamaguchi et al. | |
| 6,411,316 B1 | | 6/2002 | Shigehiro et al. | |
| 2002/0009655 A1 | * | 1/2002 | Miyamoto et al. ............ | 430/19 |
| 2004/0051934 A1 | * | 3/2004 | Machida et al. ............. | 359/296 |

FOREIGN PATENT DOCUMENTS

JP         10-232630       9/1998

* cited by examiner

Primary Examiner—Andrew H. Hirshfeld
Assistant Examiner—Leo T. Hinze
(74) Attorney, Agent, or Firm—McDermott Will & Emery LLP

(57) ABSTRACT

The invention provides an image display medium comprising: a first transparent substrate disposed on an observation side; a second substrate disposed on a further side from the observation side than the first substrate; and a display layer formed between the first substrate and the second substrate and containing a plurality of developer particles; the first substrate including a color filter having at least one group of a plurality of light-transmitting filter films of different colors. The invention also provides an image recording apparatus including a recording head for recording an image on the medium and a positioning device for positioning the filter films of the color filter and the recording head. The invention further provides an image recording method comprising the steps of positioning the filter films of the medium and the recording head, and recording an image by the recording head on the medium having the filter films positioned.

14 Claims, 23 Drawing Sheets

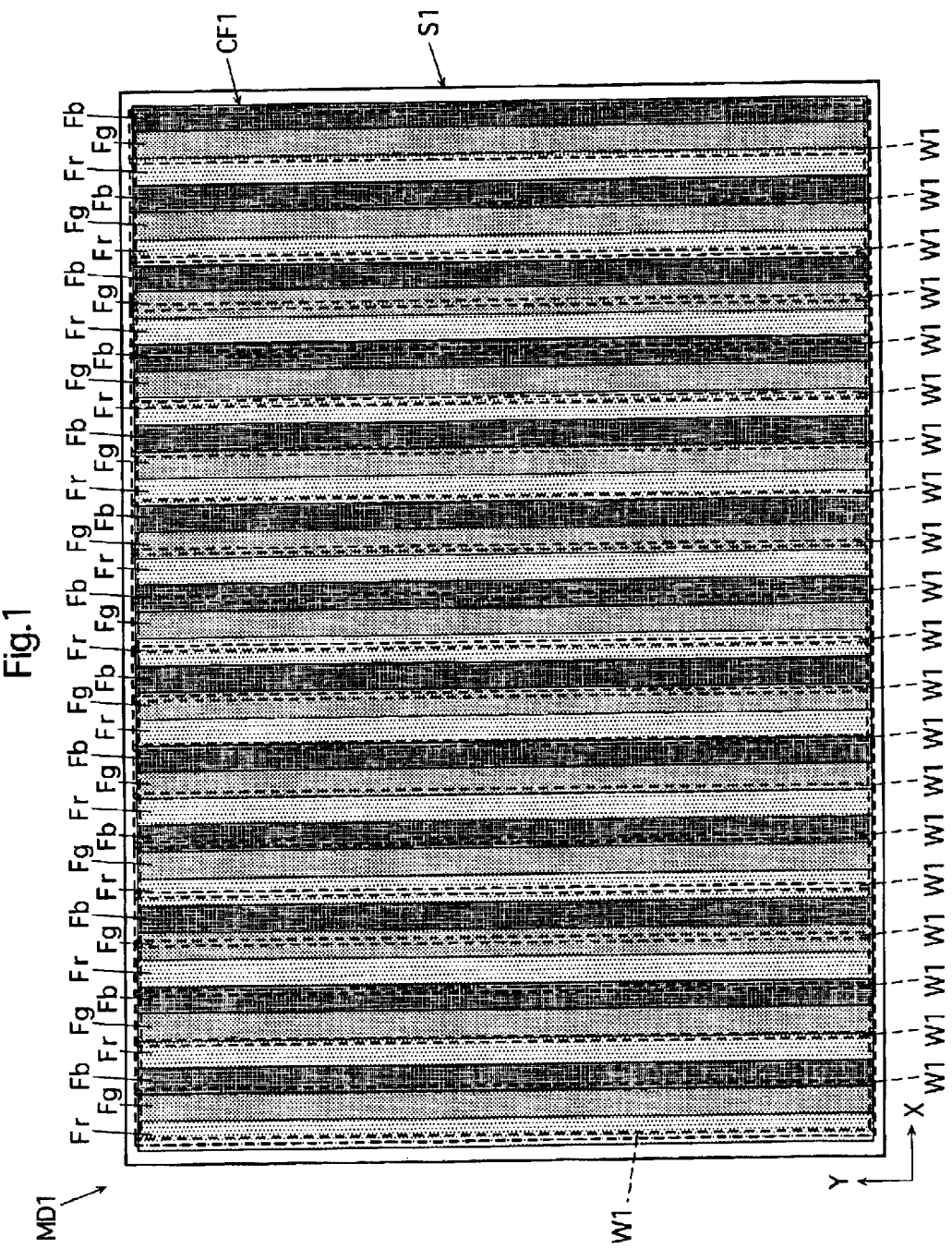

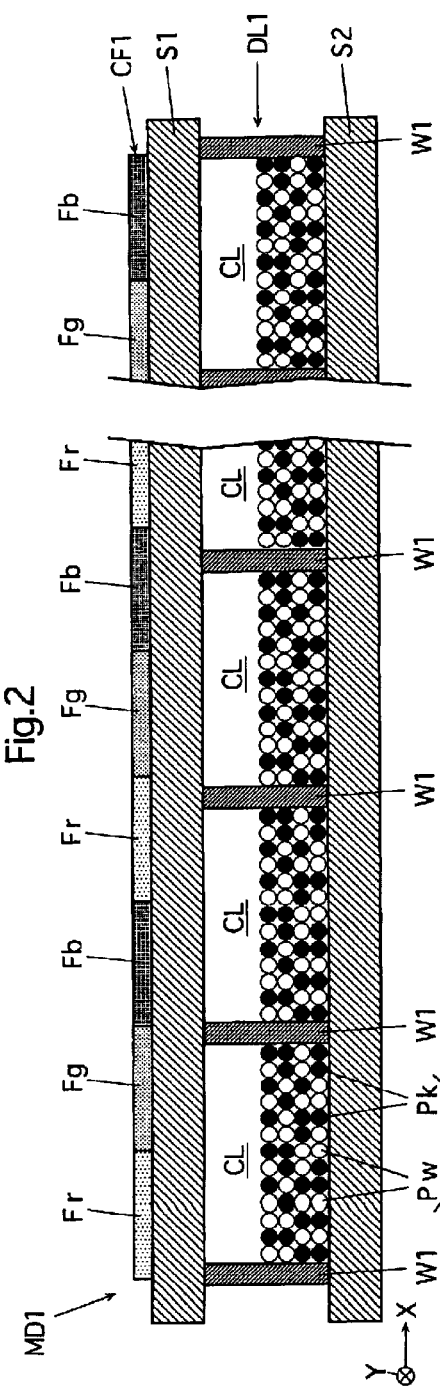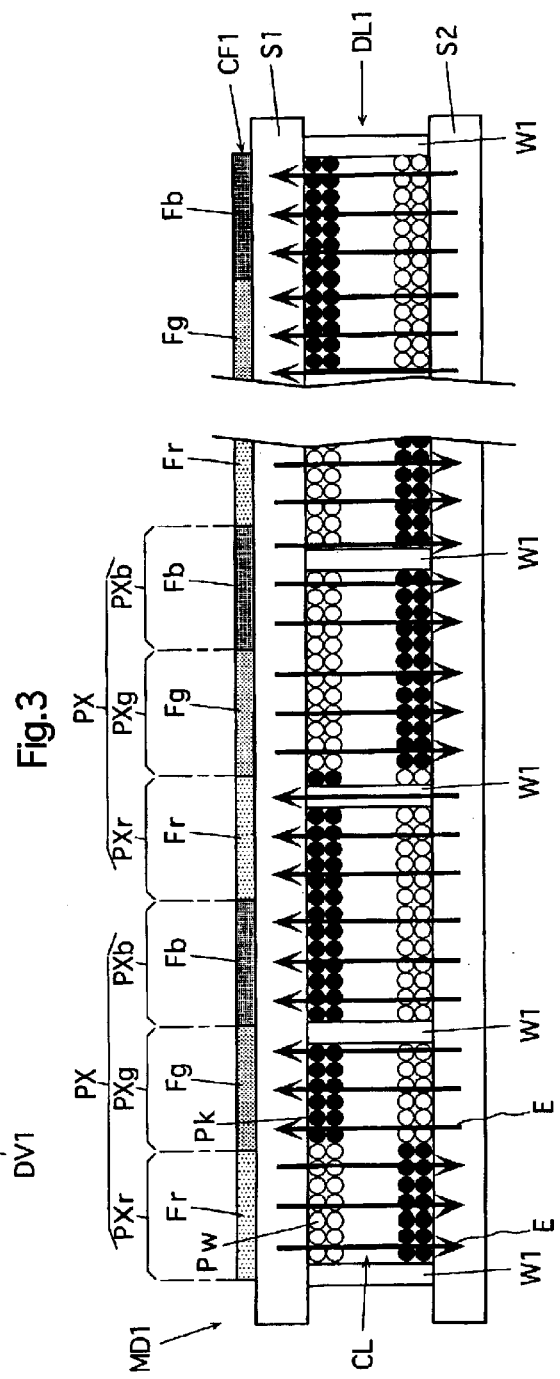

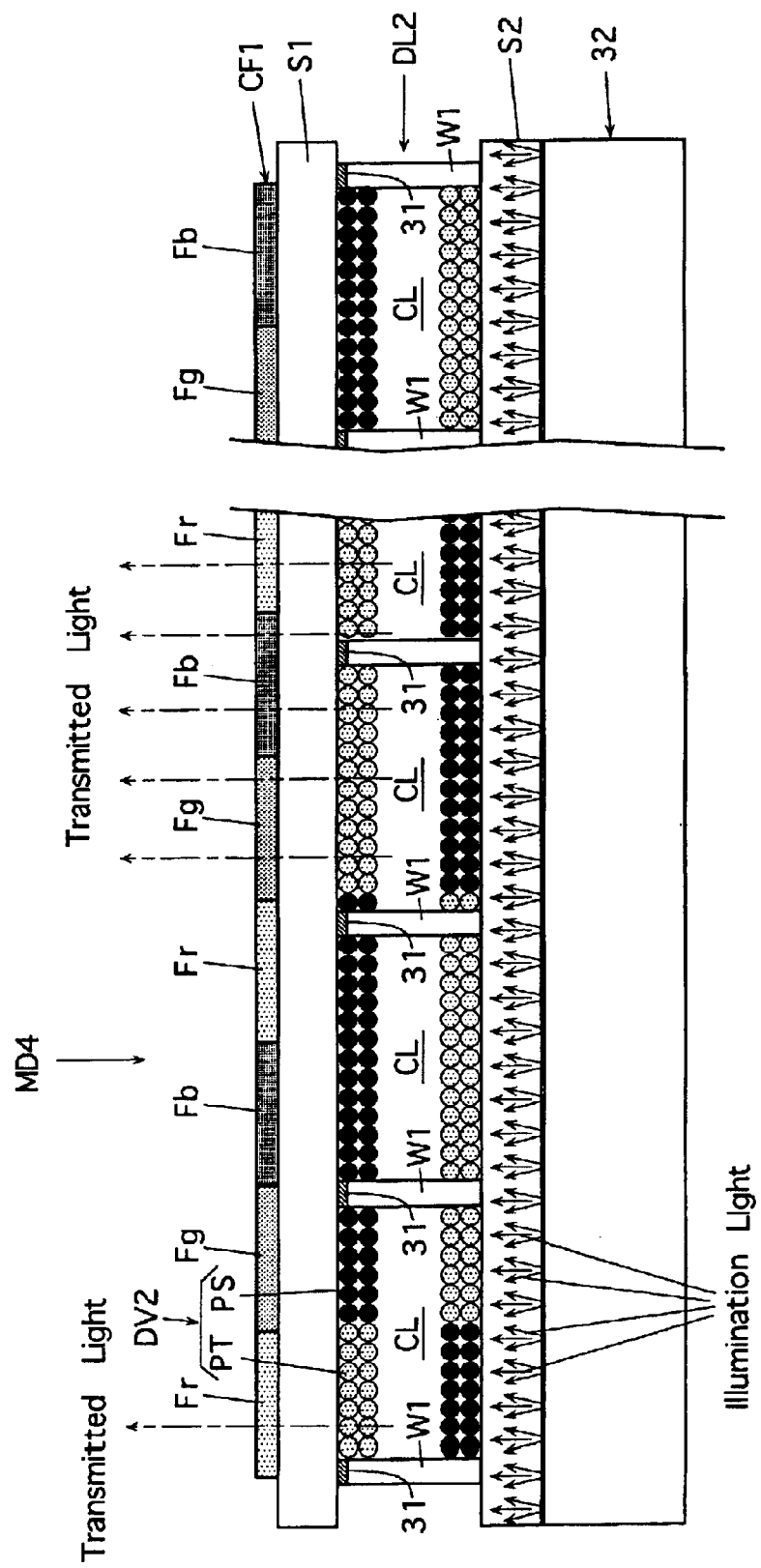

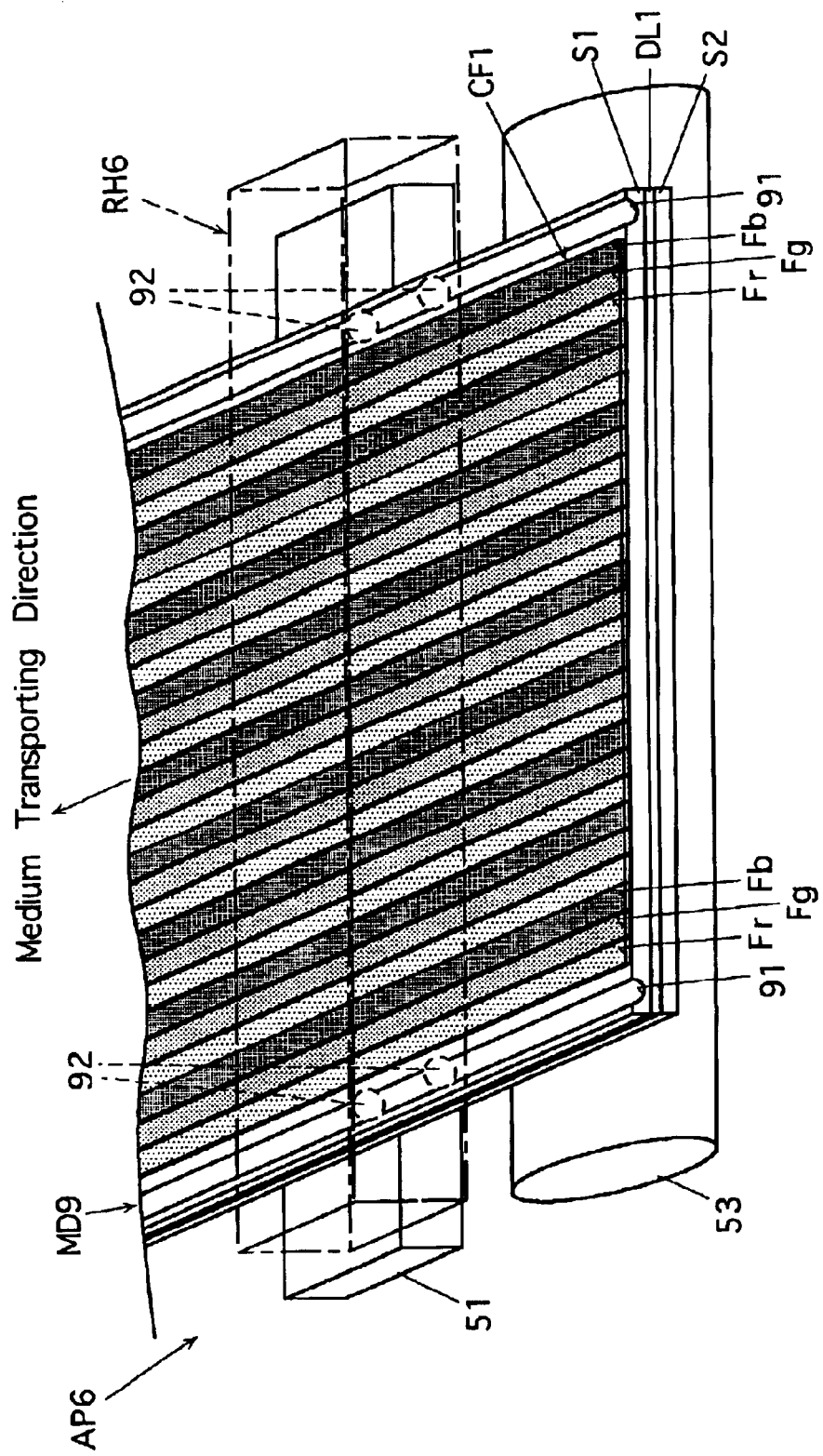

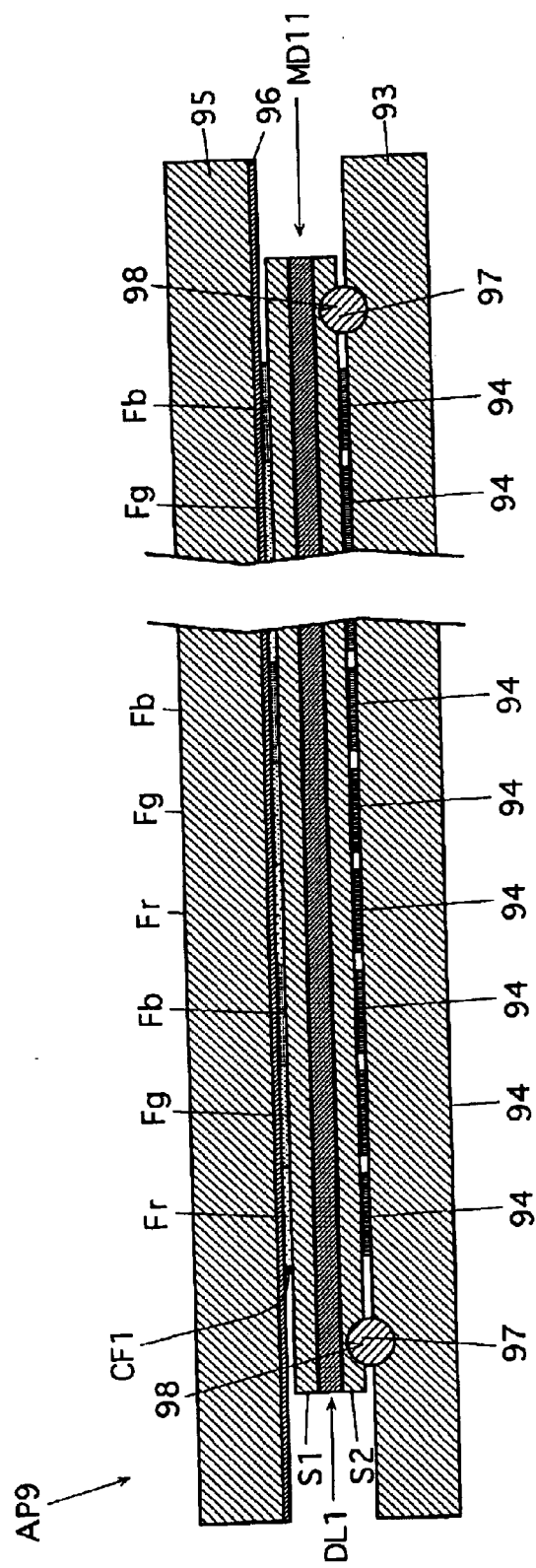

IMAGE DISPLAY MEDIUM AND IMAGE RECORDING APPARATUS

CROSS-REFERENCE TO RELATED APPLICATION

This application is based on Japanese patent application No. 2002-104216 filed in Japan on Apr. 5, 2002, the entire content of which is hereby incorporated by reference.

BACKGROUND OF THE INVENTION

1. Field of the Invention

The present invention relates to an image display medium which is allowed to perform image display by a display layer including developer particles. The invention also concerns with an image recording apparatus for recording an image on an image display medium (especially an image display medium capable of performing color image display).

2. Description of Related Art

In recent years, rewritable image display mediums called electronic paper or digital paper have been proposed as the image display medium (image recording medium) to be used in place of paper sheet for image recording and display of recorded image.

Various types of image display mediums have been proposed as such mediums. Such image display mediums generally have a display layer which is capable of changing one or more optical characteristics such as light reflectance, light transmittance, color, optical reflection density and the like.

Image recording (image formation) is executed on the mediums to display an image by changing the optical characteristic(s) in a region corresponding to each pixel in the display layer according to an image information (image data) of the pixel.

Typical examples of the mediums having such a display layer are twist ball type, electrophoresis type and dry developer-including type. The display layer in the medium of twist ball type, electrophoresis type or dry developer-including type includes a plurality of particles (i.e., developer particles) for use in image display.

In the mediums having a display layer containing a plurality of such developer particles, a partition wall for partitioning the display layer into sections may be provided, e.g., to suppress the bias of developer particles in a direction in parallel with the display layer. The partition wall is generally provided between a pair of substrates having the display layer therebetween.

SUMMARY OF THE INVENTION

An object of the present invention is to provide an image display medium which has a display layer containing a plurality of developer particles, the medium being capable of performing color display.

Another object of the present invention is to provide an image display medium wherein a display layer containing a plurality of developer particles is held between a pair of substrates and wherein a partition wall is formed for partitioning the display layer into sections, the medium being capable of color display and capable of inhibiting the partition wall from obstructing the view of displayed color image.

A further object of the present invention is to provide an image recording apparatus and an image recording method, the apparatus and the method being capable of recording an image on an image display medium capable of color display without displacement of position and capable of color display in a desired color condition on the medium.

The invention provides the following image display medium, image recording apparatus and image recording method.

(1) Image Display Medium

An image display medium comprising:
a first transparent substrate disposed on an observation side;
a second substrate disposed on a further side from the observation side than the first substrate; and
a display layer formed between the first substrate and the second substrate and containing a plurality of developer particles;
wherein the first substrate has a color filter comprising at least one group of a plurality of light-transmitting filter films having different colors.

(2) Image Recording Apparatus

An image recording apparatus for recording an image on a image display medium including a display layer capable of changing an optical characteristic of the medium, and a color filter superimposed on the display layer and having at least one group of a plurality of light-transmitting filter films having different colors, the apparatus comprising:
an image recording head for recording an image on the medium; and
a positioning device for positioning the filter films of the color filter and the recording head.

(3) Image Recording Method

An image recording method of recording an image on an image display medium including a display layer capable of changing an optical characteristic of the medium, and a color filter superimposed on the display layer and having at least one group of a plurality of light-transmitting filter films having different colors, the method comprising the steps of:
positioning the filter films of the image display medium and an image recording head for recording an image by changing the optical characteristic of the display layer; and
recording an image by the recording head on the medium having the filter films positioned.

The foregoing and other objects, features, aspects and advantages of the present invention will become more apparent from the following detailed description and the accompanying drawings.

BRIEF DESCRIPTION OF THE DRAWINGS

FIG. 1 is a schematic plan view showing an example of the developer-including type image display medium.

FIG. 2 is a schematic sectional view showing the image display medium of FIG. 1.

FIG. 3 is a view showing an image being recorded by applying an electric field to the display layer of the image display medium of FIG. 1.

FIG. 8 is a schematic sectional view showing a still further example of the developer-including type image display medium.

FIG. 18 is a schematic perspective view showing other examples of the image display medium and the image recording apparatus.

FIG. 23 is a schematic sectional view showing the image display medium and the image recording apparatus shown in FIG. 22.

DESCRIPTION OF THE PREFERRED EMBODIMENTS

Image Display Medium

Figure 4:
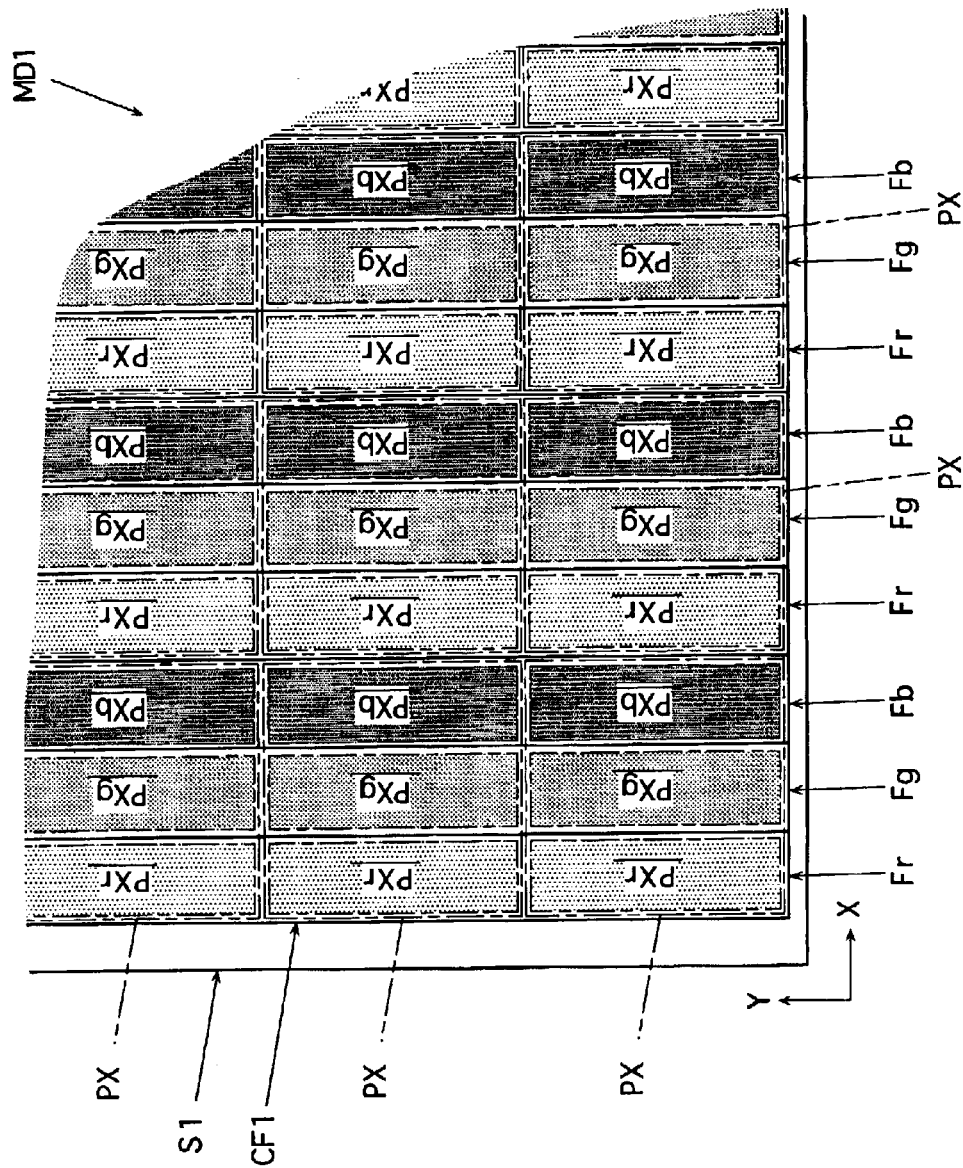
FIG. 4 is a diagram showing pixels and sub-pixels in executing image recording on the image display medium of FIG. 1.

The first to fifth type image display mediums described below as preferred embodiments of the invention basically have:

a first transparent substrate disposed on an observation side;

a second substrate disposed on a further side from the observation side than the first substrate; and a display layer formed between the first substrate and the second substrate and containing a plurality of developer particles;

wherein the first substrate has a color filter including at least one array of light-transmitting filter films having different colors.

The above-mentioned medium can be used both for light-reflecting type display and for light-transmitting type display.

The displayed image on the medium is observed from the side of the first substrate. That is, the first substrate is one arranged on the observation side (substrate arranged closer to an observer who observes the displayed image).

The second substrate is one arranged on the other side than the observation side (substrate on a further side from the observer who observes the displayed image than the first substrate).

In the following description, the side closer to the observation side (front side) may be referred to "front side" whereas the side further from the observation side may be referred to "underside".

The first substrate disposed on the observation side (front side) is transparent and has a light-transmitting property. The first substrate is typically colorless and transparent. In providing reflecting-type display, the second substrate may be opaque or transparent. In providing light-transmitting type display, the second substrate may be transparent (typically colorless and transparent).

The first substrate and/or the second substrate is, for example, made of a resin (e.g., resin film) or glass. If the resin substrate is used as the first and second substrates, the substrate is more likely to suppress the breakage than the glass substrate, and a more lightweight and/or thinner substrate could be produced. The resin film used as the first and second substrates may be flexible.

The display layer is formed between the first and second substrates. At least in a region wherein the display layer is formed between the first and second substrates, the first and second substrates are arranged with a specified gap therebetween. The first and second substrates may be closed by heat and pressure in the periphery of a region in which the display layer is formed.

The display layer is formed for producing image display and contains a plurality of particles (developer particles) useful for image display. The display layer may include only one kind of developer particles or two or more kinds of developer particles different in optical characteristics and in electrical characteristics.

Examples of the Display Layer are Given Later.

The color filter is arranged on the first substrate on the observation side. The color filter includes at least one group of a plurality of light-transmitting filter films different in color from each other.

More specifically, the color filter includes at least a first light-transmitting filter film of a first color (first transparent film in a first color), and a second light-transmitting filter film of a second color different from the first color (second transparent film in a second color).

The color filter may further include a third filter film, i.e., a light-transmitting filter film of a third color, namely a color which is different from any of the first and second colors, or may additionally include a fourth, fifth and more light-transmitting filter films different in color. Typically these filter films may be periodically arranged in a specified array pattern.

Typically an RGB color filter to be used as the color filter comprises at least three filter films of three colors, namely a light-transmitting red (R) filter film, a light-transmitting green (G) filter film and a light-transmitting blue (B) filter film.

These red, green and blue filter films are typically periodically arranged in a specified array pattern. For example, red, green and blue filter films may be arranged in a stripe array, a mosaic array or a delta array.

Light rays are transmitted through a color filter and filtered by the color filter and can be colored in the color of the filter film through which light rays have been transmitted. Thereby color display can be achieved.

The display layer to be used may be, for example, one to be used in a conventional twist ball type medium. The display layer formed in the twist ball type medium typically includes a plurality of developer particles having two surface regions (called first surface region and second surface region) which are different from each other in color and in electrical characteristics.

The first surface region and second surface region may have, for example, a white color and a black color, respectively. The first surface region and second surface region are different from each other, e.g., in zeta potential, charged polarity and like electrical characteristics.

Typically these developer particles are dispersed within a transparent support laid between two substrates. The developer particles are all held by the support in a state as surrounded with a liquid (e.g., a dielectric liquid) and therefore are rotatable with respect to the support.

When an electric field is applied to such a display layer, the first surface region or second surface region of the developer particles can be turned toward the first substrate on the observation side according to the orientation of the electric field.

On application of an electric field, the developer particles are rotated due to a difference in electrical characteristics between the first surface region and second surface region so that the first surface region or second surface region can be turned toward the first substrate. The twist ball type display layer is proper to achieve light-reflecting type display.

The display layer may be one to be used for conventional electrophoresis type mediums (mediums wherein image recording is executed utilizing an electrophoretic phenomenon). The display layer of electrophoresis type medium typically includes a plurality of developer particles having an electrophoretic capability (electrophoretic mobility)

These developer particles are dispersed in a dispersion medium arranged between the substrates. Useful dispersion mediums are, for example, liquids. The dispersion mediums may be those which maintain a solid state at room temperature but become melted when heated. The dispersion medium having developer particles dispersed therein may be enclosed in transparent microcapsules.

The display layer may be formed by interposing a plurality of such microcapsules between the substrates. The developer particles and the dispersion medium to be used are those differing from each other in optical characteristics.

When an electric field is applied to the display layer, the developer particles are electrophoretically moved in the dispersion medium and can be moved toward the side of the first or second substrate according to the orientation of the electric field.

Image recording can be executed due to a difference in optical characteristics between the developer particles and the dispersion medium. For example, light-reflecting type display can be achieved by use of opaque black developer particles and opaque white dispersion medium.

In this case, black display is achieved in a region wherein black developer particles have gathered on the side of the first substrate. In a region wherein black developer particles have gathered on the side of the second substrate (namely a white dispersion medium chiefly exists on the side of the first substrate), display is achieved in the color(s) of the filter film(s) in the color filter superimposed in the region.

The display layer may be one which is used in a dry developer-including type medium. The display layer for use in the dry developer-including type medium typically includes two kinds of developer particles, i.e., first and second developer particles, which are different from each other in optical characteristics and electrical characteristics.

The dry developer containing the first and second developer particles may contain one or more kinds of other developer particles. The dry developer is accommodated in a sealed space (closed space) formed between the substrates.

The first and second developer particles constituting the dry developer are different from each other in optical characteristics such as optical reflection density, color, light reflectance, light transmittance and the like. The first and second developer particles differ from each other also in charged polarities and like electrical characteristics. The first and second developer particles typically may be those having a frictionally electrifying capability (frictional chargeability). The first and/or second developer particles may be magnetic.

When an electric field is applied to the display layer, the first or second developer particles can be moved toward the side of the first substrate according to the orientation of the electric field. Image display can be achieved due to a difference in optical characteristics between the first and second developer particles.

For example, light-reflecting type display can be achieved by use of opaque black developer particles and opaque white developer particles as the first and second developer particles, respectively. In this case, black display is produced in a region wherein the first black developer particles have gathered on the side of the first substrate. In a region wherein second white developer particles have gathered on the side of the first substrate, display is achieved in the color(s) of the filter film(s) in the color filter superimposed in the region.

At least one partition wall for partitioning the display layer into a plurality of sections may be provided between the first and second substrates in the medium. The spacing between the first and second substrates can be kept constant by the partition wall formed therebetween.

When the electrophoresis type display layer is used, the partition wall can suppress the bias of the developer particles having an electrophoretic capability in a direction in parallel with the substrate surface. Likewise, when the dry developer-including type display layer is used, the partition wall can suppress the bias of the dry developer in a direction in parallel with the substrate surface. Optionally the partition wall may be formed integrally with the first or second substrate.

At least one electrode may be formed on the first and/or second substrate in the medium for application of an electric field to the display layer. The electrode may be provided when required. The electrode formed on the first substrate on the observation side may be transparent (typically colorless and transparent). The electrode formed on the second substrate may be transparent (typically colorless and transparent) in producing light-transmitting display and may be transparent or opaque in producing light-reflecting type display.

Next, the following description is given as to the features of first to fifth type image display mediums.

<First Type Image Display Medium>

The first type image display medium comprises:

a first transparent substrate disposed on an observation side, a second substrate disposed on a further side from the observation side than the first substrate, a display layer formed between the first substrate and the second substrate and including a plurality of developer particles, a partition wall formed between the first substrate and the second substrate for partitioning the display layer into a plurality of sections, and a color filter formed on the first substrate and comprising at least one group of a plurality of light-transmitting filter films having different colors, wherein width of the partition wall is smaller than width of any filter film of the color filter.

In the first type medium, the width of the partition wall is smaller than the width of any filter film of the color filter so that the partition wall existing in a display region is unnoticeable. Thus, the displayed image can be better observed.

Useful color filters include, for example, the above-mentioned RGB color filter (a color filter comprising a light-transmitting red filter film, a light-transmitting green filter film and a light-transmitting blue filter film). In this case, the width of the partition wall is narrower than typically the width of any of red, green and blue filter films.

The first type medium can be applied to any of twist ball type, electrophoresis type and developer-including type. Further the first type medium can be used in achieving any of the light-reflecting type and light-transmitting type display.

<Second Type Image Display Medium>

The second type image display medium comprises:

a first transparent substrate disposed on an observation side, a second substrate disposed on a further side from the observation side than the first substrate, a display layer formed between the first substrate and the second substrate and including a plurality of developer particles, a partition wall formed between the first substrate and the second substrate for partitioning the display layer into a plurality of sections, and a color filter formed on the first substrate and comprising at least one group of a plurality of light-transmitting filter films having different colors, wherein none of filter films of the color filter overlap the partition wall.

In the second type medium, none of filter films of the color filter overlap the partition wall so that the partition wall can be made unnoticeable in the displayed image. Thus, the displayed image can be better observed.

Useful color filters include, for example, the above-mentioned RGB color filter (a color filter comprising a light-transmitting red filter film, a light-transmitting green filter film and a light-transmitting blue filter film).

In this case, the red, green and blue filter films are formed in a manner not to overlap the partition wall. For example, the red, green and blue filter films corresponding to the same pixel may be arranged in a position adjacent to the partition wall. The red, green and blue filter films may be arranged in a stripe pattern and the partition wall may be set in a stripe pattern between the substrates so that the red, green and blue filter films corresponding to the same pixel may be disposed in the neighboring interval of the partition wall.

The second type medium can be applied to any of twist ball type, electrophoresis type and developer-including type. Further the second type medium can be used in achieving any display of the light-reflecting type and light-transmitting type.

<Third Type Image Display Medium>

The third type image display medium comprises:

a first transparent substrate disposed on an observation side, a second substrate disposed on a further side from the observation side than the first substrate, a display layer formed between the first substrate and the second substrate and including a plurality of developer particles, and a color filter formed on the first substrate and comprising at least one group of a plurality of light-transmitting filter films having different colors, wherein the first substrate itself is a color filter.

In the third type medium, the first substrate on the observation side is a color filter by itself so that the structure of the medium can be simplified.

The third type medium can be applied to any of twist ball type, electrophoresis type and developer-including type. Further the third type medium can be used in producing any of the light-reflecting type and light-transmitting type display.

<Fourth Type Image Display Medium>

The fourth type image display medium comprises:

a first transparent substrate disposed on an observation side, a second substrate disposed on a further side from the observation side than the first substrate, a display layer formed between the first substrate and the second substrate and including a plurality of developer particles, and a color filter formed on the first substrate and comprising at least one group of a plurality of light-transmitting filter films having different colors, wherein the display layer contains developer particles having a high light reflectance.

The fourth type medium is suitable to achieve the light-reflecting type display. In the fourth type medium, the display layer contains developer particles having a high light reflectance so that brighter display can be performed in a region wherein light is reflected by the developer particles having a high light reflectance.

When the color filter is set in the medium, display is provided especially on a light-reflecting type medium by light passing through the color filter twice so that the displayed image is likely to become dark, but bright display can be achieved by use of developer particles having higher light reflectance.

The fourth type medium can be applied to any of twist ball type, electrophoresis type and developer-including type.

The developer particles having a high light reflectance may include a deposited metal layer for increasing the light reflectance of the developer particles. The deposited metal layer may be formed of, e.g., aluminum (Al), platinum (Pt), nickel (Ni) or the like.

The deposited metal layer can be formed, for example, by vapor deposition of metal(s) such as Al, Pt, Ni or the like over the surface of base material particle made of, e.g., a resin. Another transparent layer may be formed on the deposited metal layer. For example, the deposited metal layer may be coated with a transparent resin to impart a frictional chargeability to the developer particles.

The developer particles having a high light reflectance may contain a nacreous pigment for increasing the light reflectance of the developer particles. For example, particles formed of a binder resin having the nacreous pigment dispersed therein may be used as the developer particles. Optionally base particles formed of a resin may be coated with a resin having a nacreous pigment dispersed therein to provide developer particles.

In the developer particles containing a nacreous pigment, the uppermost surface of the particles may be coated with a transparent resin.

<Fifth Type Image Display Medium>

The fifth type image display medium comprises:

a first transparent substrate disposed on an observation side, a second transparent substrate disposed on a further side from the observation side than the first substrate, a display layer formed between the first substrate and the second substrate and including a plurality of developer particles, and a color filter formed on the first substrate and comprising at least one group of a plurality of light-transmitting filter films having different colors, wherein the display layer contains light-tight (light-interrupting or light-absorbing) developer particles, and light rays transmitting from the second substrate side to the first substrate side in the display layer are selectively intercepted according to the position of light-tight developer particles in the display layer to provide light-transmitting-type display.

The fifth type medium is allowed to achieve light-transmitting type display. The fifth type medium can be applied to electrophoresis type and developer-including type mediums.

In the fifth type medium, both of first and second substrates are transparent. The display layer of the medium contains light-tight developer particles. The light rays transmitting from the second substrate side to the first substrate side in the display layer are selectively intercepted according to the position of light-tight developer particles in the display layer to achieve light-transmitting type display.

For example, when an electrophoresis type display layer is used, the display layer may contain, for example, a plurality of light-tight developer particles (e.g., opaque and black developer particles) and a transparent (typically colorless and transparent) dispersion medium.

In this case, an electric field oriented according to the image information of the pixels may be applied to a region corresponding to each pixel of the display layer, and light-tight developer particles are gathered on the side of first or second substrate, whereby light-transmitting type display can be achieved as follows.

In a region wherein the light-tight developer particles have gathered on the side of first substrate on the observation side, light incident on the display layer from the side of second substrate is intercepted by the light-tight developer particles and can not pass from the side of first substrate toward the observer. Consequently the color (e.g., black) of light-tight developer particles is displayed in this region.

On the other hand, in a region wherein the light-tight developer particles have gathered on the side of second substrate, namely in a region wherein mainly a transparent dispersion medium exists on the side of first substrate of the display layer, light incident on the display layer from the side of second substrate is emitted from the side of first substrate and is transmitted through the color filter formed on the first substrate toward the observer.

Therefore the color(s) of filter film(s) of the color filter through which the light is allowed to pass is displayed in this region, whereby light-transmitting type color display can be performed.

When a dry developer-including type display layer is used, the display layer (dry developer in the display layer) is allowed to include, e.g., light-tight (light-interrupting or light-absorbing) developer particles (e.g., opaque and black developer particles) and transparent (typically colorless and transparent) developer particles.

An electric field oriented according to the image information of the pixels is applied to a region corresponding to each pixel in the display layer, and one group of light-tight developer particles and light-transmitting developer particles is gathered on the side of first substrate while the other is gathered on the side of second substrate, whereby light-transmitting type display can be performed as follows.

In a region wherein the light-tight developer particles have gathered on the side of first substrate on the observation side, light incident on the display layer from the side of second substrate is intercepted by the light-tight developer particles and can not be emitted from the side of first substrate of the display layer toward the observer. Consequently the color (e.g., black) of light-tight developer particles is displayed in this region.

On the other hand, in a region wherein the light-tight developer particles have gathered on the side of second substrate, namely in a region wherein the light-transmitting developer particles exist on the side of first substrate of the display layer, light incident on the display layer from the side of second substrate is transmitted through the light-transmitting developer particles and is emitted through the color filter formed on the first substrate toward the observer.

Therefore the color(s) of filter film(s) of the color filter through which the light is allowed to pass is displayed in this region, whereby light-transmitting type color display can be achieved.

In the fifth type medium, a partition wall may be laid between the first substrate and the second substrate for partitioning the display layer into a plurality of sections. The partition wall is preferably transparent (typically colorless and transparent).

More specifically, preferably a transparent partition wall may be arranged between the substrates such that the partition wall is disposed in a display region. If no partition wall is set in the fifth type medium, the following trouble would occur: e.g., when the light-tight developing particles are gathered on the side of second substrate in the entire display region or a wide region to provide white display by the RGB color filter, it would become difficult to pass light into the display layer from the side of second substrate, and substantially no light is emitted from the side of first substrate of the display layer, making it difficult to achieve white display.

When a transparent partition wall is laid, light can be passed into the display layer via the transparent partition wall and white display can be achieved over the entire display region or a wide display region.

A light-reflecting layer may be formed on a surface of the partition wall opposed to the first substrate. With this structure, light incident on the inside of the display layer from the bottom of the transparent partition wall opposed to the second substrate is not emitted from the top of the partition wall opposed to the first substrate so that image display can be achieved with a higher contrast.

The light reflected by the light-reflecting layer of the partition wall is partly emitted from a region wherein light can be emitted from the side of first substrate of the display layer, so that brighter display can be achieved. The light-reflecting layer may be a white layer, e.g., formed of a white coating composition.

When such light-reflecting layer is formed on the front surface of the partition wall, a black light-absorbing layer may be provided on the side of first substrate further from the light-reflecting layer on the front surface of the partition wall opposed to the first substrate.

In this way, the quantity of light reflected by the front surface of partition wall can be reduced, and display with a higher contrast can be achieved. The black light-absorbing layer may be formed, for example, on the light-reflecting layer of the partition wall. The black light-absorbing layer may be formed on a region corresponding to the partition wall in the color filter.

The above-described characteristic structures of first type to fifth type image display mediums may be provided in combination unless they bring about a disadvantage.

Image Recording Apparatus
(Image Forming Apparatus)

The description of three, i.e., first to third type image recording apparatuses (image forming apparatuses) for recording an image on the image recording medium are given below as preferred embodiments of the invention.

Any type of the image recording apparatus can be used to record an image on the above mentioned first to fifth type image display mediums.

Any type of the image recording apparatus is provided to record an image on an image display medium having a display layer capable of changing the optical characteristic (s) and a color filter comprising at least one group of a plurality of light-transmitting color filter films of different colors and superimposed on the display layer.

The display layer is capable of changing the optical characteristic(s) such as light reflectance, light transmittance and the like. The display layer may be one including the above-mentioned developer particles (e.g., twist ball type, electrophoretic type or developer-including type display layer). The display layer may be optionally one which does not include the developer particles such as a liquid crystal layer.

The color filter is superimposed on the display layer. The color filter may be directly superimposed on the display layer, or may be indirectly superimposed on the display layer via other members (such as substrates for holding the display layer therebetween). The color filter may be, for example, the above-mentioned RGB color filter.

Any type of the image recording apparatus is basically provided with a positioning device for positioning the image recording apparatus and the filter films of the color filter in the medium. The positioning device can suppress the displacement of position between them, can realize precise color reproduction and allows the medium to accomplish good color display.

Described below are the features of each type of image recording apparatus.

<First Type Image Recording Apparatus>

The first type image recording apparatus is provided to record an image on an image display medium including a display layer capable of changing an optical characteristic of the medium, and a color filter superimposed on the display layer and having at least one group of a plurality of light-transmitting filter films having different colors.

The first type image recording apparatus comprises an image recording head capable of changing the optical characteristic of the display layer, wherein image recording is executed on the medium while moving the recording head relatively to the medium, and wherein when the image recording is executed on the medium while moving the recording head relatively to the medium, the image recording position can be determined by detecting at least one of the positions of the filter films of the color filter on the medium.

In the first type image recording apparatus, image recording is executed using the recording head capable of changing the optical characteristic of the display layer (the recording head for changing the optical characteristic of the display layer).

The recording head may be of the type capable of executing image recording for one sub-pixel at one time or may be of the type capable of executing image recording for a plurality of sub-pixels at one time.

The recording head may be, for example, of the type capable of executing image recording for all sub-pixels on one line at one time or may be of the type capable of executing image recording for one or more sub-pixels on each of plural lines at one time.

Image recording is executed while moving the recording head relatively to the medium. Image recording is achieved while scanning an image recording region (image display region) of the medium with the recording head by moving the recording head relatively to the medium.

That is to say, the image recording may be executed with the medium disposed at a specified position while moving the recording head, or the image recording may be executed with the recording head disposed at a specified position while moving the medium.

The image recording may be executed while moving both the medium and the recording head. The more the number of sub-pixels capable of performing image recording by the recording head at one time is, the shorter the time required for recording the entire image is.

The sub-pixel is a pixel element for constituting a single pixel. The single pixel is composed of a plurality of sub-pixels. The sub-pixels constituting the single pixel is disposed in a region wherein the sub-pixels are superimposed on filter films of different colors in the color filter, respectively.

When, for example, the above-mentioned RGB color filter is used as the color filter, typically a single pixel is composed of a sub-pixel superimposed on a red filter film, a sub-pixel superimposed on a green filter film and a sub-pixel superimposed on a blue filter film. A single filter film may be formed either to provide a single sub-pixel or to provide a plurality of sub-pixels.

In executing image recording on an image display medium having a color filter, the recorded image (displayed image) would be likely to be different in color, color tone or like color conditions from desired ones, if image recording is not achieved at a proper position, or if image recording is not achieved according to image information of each sub-pixel (e.g., if an electric field to be oriented according to the image information of the sub-pixel is not applied to a region of the display layer corresponding to each sub-pixel), in other words, if image recording is carried out according to the image information of a sub-pixel different from the intended sub-pixel due to displacement of image recording position.

When image recording is performed on the first type image recording apparatus while moving the recording head relatively to the medium as described above, an image recording site is positioned by detecting the filter films of the color filter on the medium (i.e., by detecting the positional relation between the recording head and the filter films of the color filter).

Further, the positions of the sub-pixels superimposed on the filter films are detected by detecting the positions of filter films of the color filter in the medium. Thereby image recording can be achieved at a proper position by the recording head. Therefore, the first type image recording apparatus can form a color image in the intended color condition.

The position of each of the filter films of the color filter may be directly detected or may be indirectly detected by detecting the position of a medium component disposed in a specified positional relation with the filter films to detect the positions of the filter films based on the position of the medium component. More specifically, the detection of the filter films may be carried out, for example, as follows.

For example, the positions of the filter films may be directly detected using a photosensor (e.g., color photosensor) confronting the color filter and held in a specified positional relation with the recording head. That is to say, when image recording is executed on the medium while moving the recording head relatively to the medium, the positions of filter films of the color filter may be (directly) detected by the photosensor.

The photosensor may be mounted, e.g., on the recording head. In this case, the position of at least one of filter films in the color filter may be detected by the photosensor in executing image recording.

Of course, the positions of all filter films may be detected or the positions of not all but plural filter films (e.g., filter films of specified colors) may be detected.

For example, when a specified positional relation with each other exists between two filter films, the position of one filter film can be indirectly detected by detecting the position of the other filter film. Consequently the positions of all filter films can be detected by detecting at least one of filter films in the color filter with the photosensor.

When the medium has a transparent partition wall for partitioning the display layer into sections (e.g., when the medium has first and second transparent substrates holding the display layer therebetween and a partition wall laid therebetween for partitioning the display layer into sections) and when the filter films of the color filter are disposed in a specified positional relation with the transparent partition wall, the positions of filter films of the color filter may be indirectly detected as follows. Namely the detection is carried out in a manner as described below using a light-receiving element opposed to one surface of the medium and an light-emitting element opposed to the other surface thereof, these elements being held in a specified positional relation with the recording head.

When image recording is carried out on the medium while moving the recording head relatively to the medium, light rays emitted from the light-emitting element and passing through the transparent partition wall laid for partitioning the display layer are detected by the light-receiving element to detect the position of the transparent partition wall.

At least one of the positions of the filter films of the color filter held in a specified positional relation with the transparent partition wall is detected based on the position of transparent partition wall. The light-receiving element held in a specified positional relation with the recording head may be mounted, e.g., on the recording head.

The light-emitting element may be disposed in a specified positional relation with the recording head or may not. When the medium has a plurality of partition walls arranged at a specified pitch in a relatively moving direction, the position of at least one partition wall may be detected in executing image recording.

<Second Type Image Recording Apparatus>

The second type image recording apparatus is also provided to record an image on an image display medium including a display layer capable of changing an optical characteristic of the medium, and a color filter superimposed on the display layer and having at least one group of a plurality of light-transmitting filter films having different colors.

The second type image recording apparatus comprises a positioning device for mechanically positioning the image recording apparatus and filter films of the color filter in the medium, wherein image recording is executed on the medium.

The second type image recording apparatus is provided with the positioning device for mechanically positioning the medium and the apparatus so that the filter films of the color filter can be set with respect to the apparatus without displacement of position. Thereby the second type image recording apparatus can suppress the displacement of position in executing image recording.

For example, when a first engagement portion such as a convex portion or concave portion is formed in the medium and the filter films of color filter are disposed in a specified positional relation with the first engagement portion, a positioning operation may be carried out, for example, to position the image recording apparatus and the filter films of the color filter as follows.

That is, a second engagement portion which can be engaged with the first engagement portion provided in the medium is formed in the image recording apparatus and the first engagement portion of the medium is engaged with the second engagement portion of the apparatus, whereby a positioning operation is performed to position the filter films of the color filter held in the specified positional relation with the first engagement portion.

The second engagement portion of the apparatus may be in a shape corresponding to the first engagement portion of the medium. When the first engagement portion takes, for example, a concave form (or convex form), the second engagement portion takes a convex form (or concave form) which can be engaged with the concave portion (convex portion) of the medium.

Stated more specifically, the second type image recording apparatus is, for example, as described below in (a) and (b).

(a) For example, the image recording apparatus is provided with a pixel electrode substrate superimposed on one surface of the image display medium and having a plurality of sub-pixel electrodes corresponding to the sub-pixels. The pixel electrode substrate has the second engagement portion in a specified positional relation with the sub-pixel electrodes, the second engagement portion being engageable with the first engagement portion formed in the medium.

By engagement of the first engagement portion of the medium with the second engagement portion of the pixel electrode substrate, a positioning operation can be carried out to position the sub-pixel electrodes (in a specified positional relation with the second engagement portion) of the pixel electrode substrate and to position the filter films of the color filter held in a specified positional relation with the first engagement portion.

(b) As described above, the image recording apparatus is allowed to execute image recording on the medium while moving the recording head capable of changing the optical characteristic of the display layer in the medium (the recording head for changing the optical characteristic of the display layer in the medium) relatively to the medium.

In this case, the recording head has, for example, a convex portion (second engagement portion) which can be engaged in a linear groove (first engagement portion) formed in the medium, whereby a positioning operation can be done to position the filter films of the color filter held in a specified positional relation with the groove and to position the recording head by engagement of the convex portion of the recording head in the groove of the medium.

The recording head may be moved relatively to the medium while guiding the convex portion of the recording head in the groove of the medium. The recording head may have a plurality of convex portions engageable in a plurality of grooves (e.g., two grooves extending in parallel with each other) formed in the medium.

Optionally the recording head may have a linear groove (second engagement portion) which can be engaged with a convex portion (first engagement portion) formed on the medium.

A positioning operation can be done to position the filter films of the color filter held in a specified positional relation with the convex portion of the medium and to position the recording head by engagement of the convex portion of the medium in the groove of the recording head. The recording head may be moved relatively to the medium while guiding the convex portion of the medium in the groove of the recording head.

The recording head may have a plurality of linear grooves formed in parallel with each other which are engageable with a plurality of (e.g., two) convex portions formed in the medium.

<Third Type Image Recording Apparatus>

The third type image recording apparatus is also one for recording an image on an image display medium including a display layer capable of changing an optical characteristic of the medium, and a color filter superimposed on the display layer and having at least one group of a plurality of light-transmitting filter films having different colors.

The third type image recording apparatus comprises a positioning device for electrically positioning the apparatus and the filter films of the color filter, wherein image recording is executed on the above-mentioned medium.

In the third type image recording apparatus, the apparatus and the filter films of the color filter can be positioned by the positioning device, whereby an image can be recorded on the medium without displacement of position.

When the medium has a float electrode provided in a specified positional relation with the filter films of the color filter, the positioning device may be, for example, of the following type.

For example, the position of float electrode on the medium may be detected by detecting a difference between an electrostatic capacity in a medium region wherein the float electrode is formed on the surface of the medium and an electrostatic capacity in a medium region wherein the float electrode is not formed.

The apparatus and the filter films of the color filter can be positioned by detecting at least one of the positions of the filter films of the color filter held in a specified positional relation with the float electrode based on the detected position of the float electrode.

The positioning device may include two detection electrodes spaced away with a gap corresponding to the size of the float electrode of the medium. In this case, the position of the float electrode may be detected by detecting the presence or absence of conduction between the two detection electrodes by contacting the two detection electrodes with the float electrode-forming surface of the medium. Likewise the image recording apparatus and the filter films can be positioned.

Examples of the Image Display Mediums and Image Recording Apparatuses

Next, various examples of image display mediums and image recording apparatuses will be successively described with reference to the drawings. In the following description, specified numerical values and names of materials are referred to. However, the image display mediums and image recording apparatuses according to the invention are not limited to them.

<Image Display Medium MD1 (See FIGS. 1 to 4)>

FIGS. 1 and 2 show a schematic plan view and a schematic sectional view, respectively showing an example of the image display medium. An image display medium MD1 of FIGS. 1 and 2 is a developer-including type medium which performs a light-reflecting type display.

The image display medium MD1 has a pair of substrates S1, S2 with a specified gap therebetween. A display layer DL1 is held between the substrates. A displayed image on the medium MD1 is observed from a front side of the medium in FIG. 2, namely from the side of the substrate S1.

The substrate S1 on the observation side is colorless and transparent, and is made of polyethylene terephthalate (PET) in this example. The substrate S2 on a further side from the observation side is colorless and transparent in this example, and is made of polyethylene terephthalate (PET).

A color filter CF1 is formed on the substrate S1 on the observation side. The color filter CF1 comprises a plurality of light-transmitting red filter films Fr, a plurality of light-transmitting green filter films Fg, and a plurality of light-transmitting blue filter films Fb. The red, green, and blue filter films Fr, Fg, Fb are arranged in a stripe pattern as shown in FIG. 1. The red, green, and blue filter films Fr, Fg, Fb extend in a direction in parallel with each other in a direction of a short side of the medium in this example. Optionally the filter films may extend in a direction in parallel with a long side of the medium.

The display layer DL1 is partitioned into a plurality of sections with partition walls W1 formed between the substrates. Thereby a plurality of cells CL are formed between the substrates. The partition wall W1 is formed of a transparent curable resin in this example, and is fixed to both of the substrates S1, S2. Each cell CL extends in a line and, in this example, in a direction in parallel with the filter films of the color filter CF1. Each cell CL provides a closed space (tightly closed space) and accommodates a dry developer DV1 therein.

In this example, parts of the medium MD1 have the following sizes. The substrate S1 is 25 $\mu$m in thickness, the partition wall W1 is 100 $\mu$m in height, and the substrate S2 is 25 $\mu$m in thickness. The partition wall W1 is 30 $\mu$m in width. The distance between adjacent partition walls W1 is 470 $\mu$m. Each cell CL is 470 $\mu$m in width, 100 $\mu$m in height and 500 $\mu$m in pitch. The red, green and blue filter films Fr, Fg, Fb of the color filter CF1 are each 200 $\mu$m in width. Therefore, the width of the partition wall W1 is shorter than the width of any of the filter films Fr, Fg, Fb as shown in FIG. 2.

The dry developer DV1 accommodated in the cells are composed of two kinds of developer particles, i.e., white developer particles Pw and black developer particles Pk. The developer particles Pw, Pk are made of a binder resin having a coloring agent and the like dispersed therein.

More specifically, the white developer particles Pw are produced as follows. First, the following materials are fully mixed by a Henschel mixer: 100 parts by weight of thermoplastic polyester resin (softening point 121° C., and glass transition point 65° C.) as a binder resin, 40 parts by weight of titanium oxide as a white pigment and 5 parts by weight of salicylic acid-zinc complex as a negative charge controlling agent. The mixture is kneaded by a twin-screw extruder and cooled. The mixture thus prepared is roughly pulverized and finely pulverized by a jet mill. The finely divided material (particles) is classified by wind, giving white particles having an average particle size of 12 $\mu$m. 0.3 parts by weight of hydrophobic silica particles is added to the white particles, and is mixed by a Henschel mixer, giving white developer particles Pw.

The black developer particles Pk are produced as follows. First, the following materials are fully mixed by a Henschel mixer: 100 parts by weight of styrene-n butyl-methacrylate resin (softening point 132° C., and glass transition point 65° C.) as a binder resin, 2 parts by weight of carbon black as a black coloring agent, 1.5 parts by weight of silica as a positive charge controlling agent, and 500 parts by weight of a magnetite-containing powder. The mixture is kneaded by a twin-shaft kneader and cooled. The mixture is roughly pulverized by a feather mill and finely pulverized by a jet mill. The finely divided material (particles) thus obtained is classified by wind, giving black developer particles Pk having a volume average particle size of 25 μm. The black developer particles Pk contain a magnetic powder and are magnetic.

Thirty (30) grams of the thus obtained white developer particles Pw and seventy (70) grams of the black developer particles Pk are placed into a bottle formed of polyethylene. Then the bottle is rotated on a ball mill pedestal to mix the particles for 30 minutes so that a dry developer DV1 is obtained. The white and black developer particles Pw and Pk are frictionally charged to negative polarity and positive polarity, respectively by stirring. The cell CL accommodates the dry developer DV1 at a rate of about 30% of the volume of the cell.

An image can be formed on the image display medium MD1 in the following manner. In forming an image, an electric field E oriented in a direction orthogonal or substantially orthogonal to the surface of the medium substrate is applied to the dry developer DV1 in the cell CL of the display layer DL1 as shown in FIG. 3.

In this example, an electric field is applied to the display layer DL1 with a sub-pixel unit shown in FIG. 4. As illustrated in FIG. 4, a single pixel PX is composed of three adjacent sub-pixels PXr, PXg, PXb. The sub-pixels PXr, PXg, PXb are superimposed on red, green and blue filter films Fr, Fg, Fb, respectively.

As described above, the white and black developer particles Pw and Pk constituting the developer DV1 are charged to negative and positive polarities, respectively, so that on application of an electric field, one of two particle groups among white and black developer particles Pw and Pk is moved toward the substrate S1 while the other group is moved toward the substrate S2 according to the orientation of the electric field.

In a region wherein an electric field E oriented downward in FIG. 3 has been applied, the negatively charged white developer particles Pw move toward the substrate S1 relatively to the black developer particles Pk. In a region wherein an electric field E oriented upward in FIG. 3 has been applied, the positively charged black developer particles Pk move toward the substrate S1 relatively to the white developer particles Pw.

In a region wherein the white developer particles Pw have moved toward the substrate S1 on the observation side, light rays transmitted through the color filter CF1 into the display layer DL1 are reflected by the white developer particles and are passed again through the color filter CF1 toward the observer. Consequently in the sub-pixels PXr, PXg and PXb wherein the white developer particles Pw have gathered toward the substrate S1, filtration is carried out with the red, green, and blue filter films Fr, Fg, Fb to display red, green, and blue components, respectively.

In a region wherein the black developer particles Pk have moved toward the substrate S1, light rays pass through the color filter CF1 into the display layer DL1 and are absorbed by the black developer particles Pk. Consequently in the sub-pixels PXr, PXg and PXb wherein the black developer particles Pk have gathered toward the substrate S1, a black component is displayed.

The color displayed in each pixel PX is a additive color mixture of component colors to be displayed in the sub-pixels PXr, PXg and PXb constituting the pixel. For example, red display is achieved in the pixel PX in the left end of FIG. 3 and a cyan color (green+blue) display is achieved in the pixel PX in the second place from the left end of FIG. 3.

Thereby, an electric field oriented according to the image information (image data) of each of the sub-pixels is applied to a region corresponding to the sub-pixel of the display layer DL1, whereby the desired color image can be formed on the medium MD1.

An oscillating magnetic field may be applied to the dry developer DV1 at the same time as or before application of the electric field to the dry developer DV1 in the cell. The dry developer DV1 contains the black developer particles Pk having magnetism as stated above so that the dry developer DV1 can be stirred and oscillated by applying the oscillating magnetic field to the dry developer DV1.

This agitation increases the charge quantity of the white and black developer particles Pw, Pk having a frictional chargeability and results in an increase of electrostatic force exerted on the developer particles Pw, Pk by application of the electric field, thereby facilitating the movement of the developer particles Pw, Pk in a direction of electrostatic force exerted.

Furthermore, the fluidity of the developer DV1 (the white and black developer particles Pw, Pk) is increased by oscillation of the developer DV1, whereby the white and black developer particles Pw, Pk become easily movable by application of the electric field.

In the medium MD1, the width of the partition wall W1 is smaller than the width of any of the filter films Fr, Fg, Fb of the color filter CF1 as described above. Consequently the partition wall W1 is made more unnoticeable in providing image display than when the width of the partition wall W1 is identical with or larger than the width of the filter films. This attenuates the possibility of the partition wall W1 obstructing the recognition of displayed image, whereby the medium MD1 can display a good color image.

<Image Display Medium MD2 (See FIG. 5)>

Figure 5:
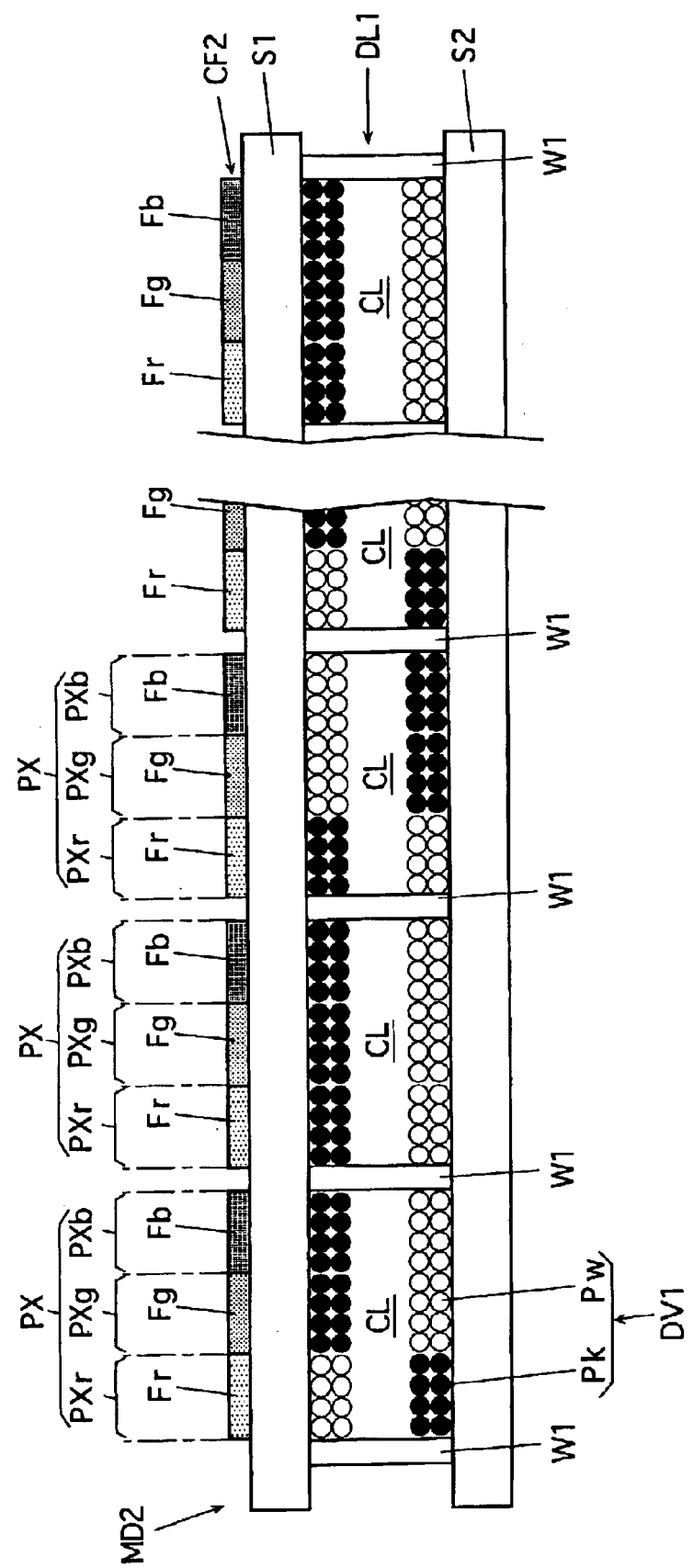
FIG. 5 is a schematic sectional view showing another example of the developer-including type image display medium.

FIG. 5 is a schematic sectional view showing another example of the image display medium. An image display medium MD2 of FIG. 5 is substantially the same as the image display medium MD1 shown in FIG. 2 with the exception of using a color filter CF2 in place of the color filter CF1. In FIGS. 2 and 5, like parts having the same function are indicated by like reference symbols.

The color filter CF2 of the medium MD2 formed over the substrate S1 on the observation side comprises red, green, and blue filter films Fr, Fg, Fb like the color filter CF1 of the medium MD1. In the medium MD2, as in the medium MD1, the width of the partition wall W1 is smaller than the width of any of the filter films Fr, Fg, Fb. In the color filter CF1 of the medium MD1, the partition walls W1 overlap parts of the filter films Fr, Fg, Fb, whereas the filter films Fr, Fg, Fb of the color filter CF2 in the medium MD2 do not overlap the partition walls W1. In the color filter CF2, three adjacent filter films Fr, Fg, Fb providing the same pixel PX are disposed between adjacent partition walls W1.

In the medium MD2, the width of the partition wall W1 is smaller than the width of the filter films Fr, Fg, Fb. In addition, the partition wall W1 does not overlap the filter films Fr, Fg, Fb, so that the partition wall W1 becomes more unnoticeable in performing image display, whereby the medium MD2 can display a better color image.

In producing the medium MD2, for example, the partition walls W1 are formed after forming the color filter CF2 on the substrate S1. These medium components may be arranged by controlling the positions of the partition walls W1 to be formed, based on the positions of the filter films Fr, Fg, Fb of the color filter CF2 in such manner that the filter films do not overlap the partition walls W1 as described above.

In producing the medium MD1 of FIG. 2 as described above, the partition walls W1 and the filter films Fr, Fg, Fb are formed merely such that the width of the partition wall W1 is smaller than the width of any of the filter films Fr, Fg, Fb of the color filter CF1. More specifically, it is unnecessary to precisely control their positions so as to bring about a specified positional relationship between the partition walls W1 and the filter films. This facilitates production of the medium MD1 accordingly.

<Image Display Medium MD3 (See FIG. 6)>

Figure 6:
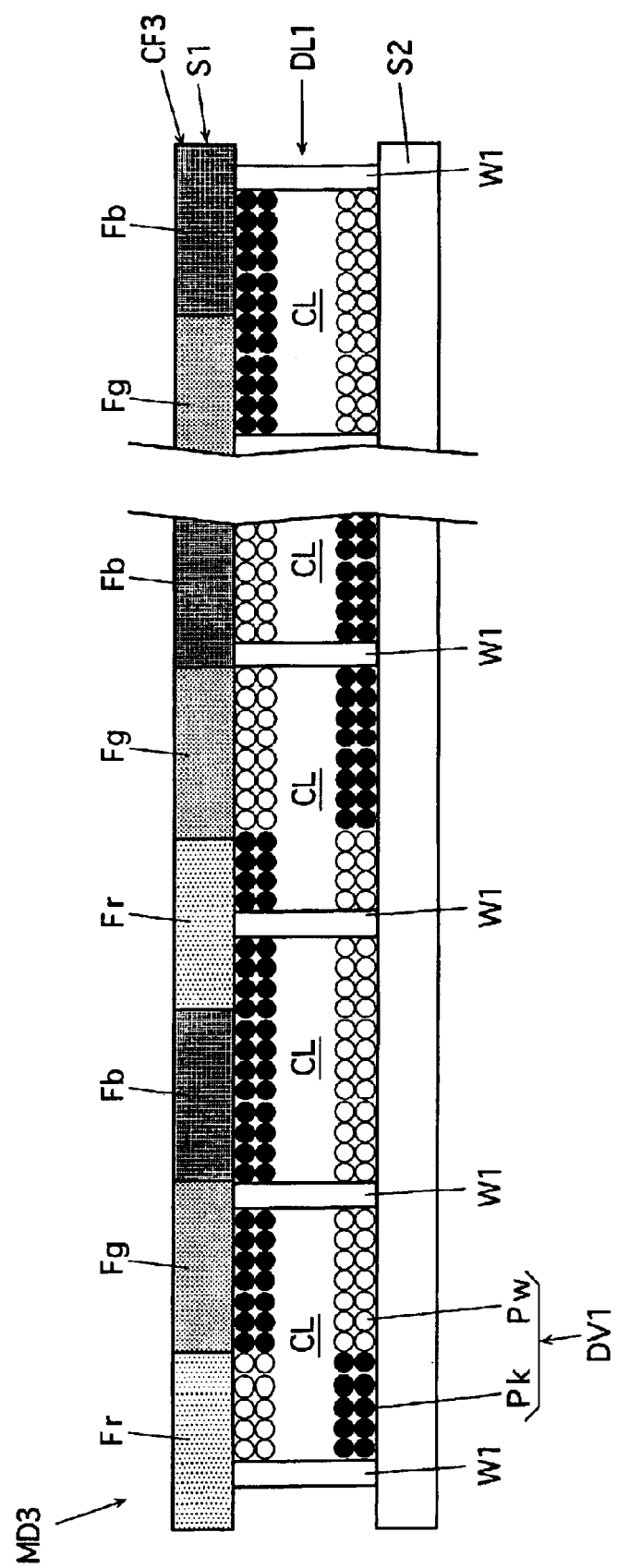
FIG. 6 is a schematic sectional view showing a further example of the developer-including type image display medium.

FIG. 6 is a schematic sectional view showing a further example of the image display medium. An image display medium MD3 of FIG. 6 is substantially the same as the image display medium MD1 of FIG. 2 except for the following. Like parts having the same function are indicated by like reference symbols.

In the medium MD3, the substrate S1 on the observation side serves also as a color filter CF3 and is substantially the color filter CF3 by itself. The color filter CF3 of the medium MD3 comprises red, green, and blue filter films Fr, Fg, Fb like the color filter CF1 of the medium MD1. In the medium MD3, the width of the partition wall W1 is smaller than the width of the filter films Fr, Fg, Fb.

In the medium MD3, the substrate S1 itself is the color filter CF3 so that the structure of the medium can be simplified and uncomplicated.

Figure 7A:
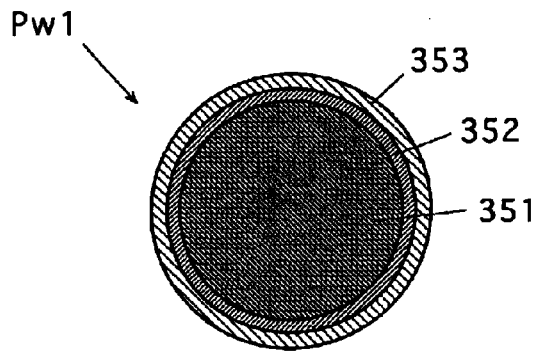
FIG. 7(A) to FIG. 7(C) are schematic sectional views showing other examples of the developer particles.
Figure 7B:
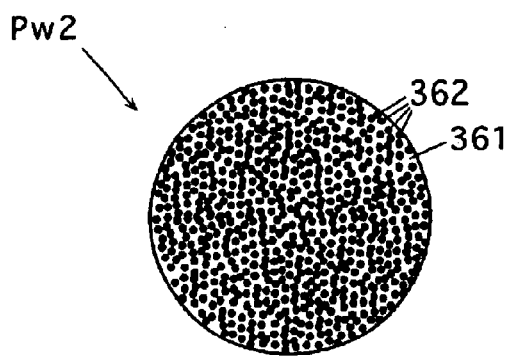
Figure 7C:
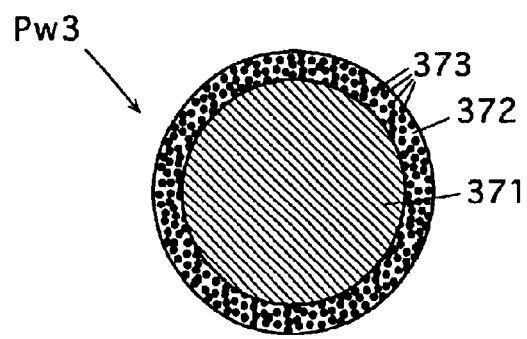

<Other Examples of Developer Particles of Mediums MD1 to MD3 (See FIG. 7(A) to FIG. 7(C))>

In the aforesaid mediums MD1 to MD3, developer particles having a high light reflectance shown in FIG. 7(A) to FIG. 7(C) may be used as the developer particles for reflecting the light incident on the display layer in place of the white developer particles Pw.

The developer particles Pw1 of FIG. 7(A) have base particles 351 on which a deposited metal film 352 and a colorless transparent resin film 353 are formed. The metal film 352 can be formed by depositing a metal (Al, Pt or Ni or the like) on the base particles 351. The colorless transparent resin film 353 are formed on the deposited metal film 352 to give a frictional chargeability to the developer particles Pw1. The developer particles Pw1 can effectively reflect incident light because the particles Pw1 have the deposited metal film 352 of high light reflectance.

The developer particles Pw2 of FIG. 7(B) are made of a binder resin 361 having a nacreous pigment 362 dispersed therein. The developer particles Pw2 can effectively reflect incident light because the particles Pw2 contain a nacreous pigment of high light reflectance.

The developer particles Pw3 of FIG. 7(C) have base particles 371 coated with a resin 372 having a nacreous pigment 373 dispersed therein. A surface layer is formed of the resin 372 containing the nacreous pigment 373 of high light reflectance, so that the developer particles Pw3 can effectively reflect incident light.

In this way, the medium can perform brighter light-reflecting type display when developer particles Pw1, Pw2 or Pw3 having high light reflectance are used.

<Image Display Medium MD4 (See FIG. 8)>

FIG. 8 is a schematic sectional view showing a still further example of the image display medium. An image display medium MD4 of FIG. 8 is substantially the same as the image display medium MD1 shown in FIG. 2 except for the following. Like parts having the same function are indicated by like reference symbols.

The medium MD4 is provided for performing light-transmitting type display. In the medium MD4, a display layer DL2 is laid between the substrates. The display layer DL2 is partitioned into a plurality of sections by the partition walls W1. Thereby a plurality of cells CL are formed between the substrates. Each cell of the display layer DL2 accommodates a dry developer DV2 therein.

The dry developer DV2 is composed of colorless and transparent developer particles PT and black light-tight (light-interrupting or light-absorbing) developer particles PS. The developer particles PT, PS have a frictional chargeability. In this example, the transparent developer particles PT have negative charged polarity while the light-tight developer particles PS have positive charged polarity. A white light-reflecting film 31 is formed on the top of each of the partition walls W1 opposed to the substrate S1.

In the medium MD4 as in the medium MD1 of FIG. 3 as described above, an electric field oriented according to the image information of each of the sub-pixels is applied to the developer DV2 in the sub-pixel, and the transparent developer particles PT or light-tight developer particles PS can be gathered toward the substrate S1 on the observation side according to the image information of the sub-pixel.

Image display is performed on the medium MD4 by controlling the transmission of illumination light (luminous light) from a backlight device 32 fixed to the rear side of the medium (side of substrate S2) with the display layer DL2, more specifically, by controlling the transmission of light rays according to the positions of developer particles PT and PS in the display layer DL2.

Examples of the backlight device 32, for example, include those to be used in a light-transmitting type liquid crystal display device, such as those having a cold-cathode tube, a light-reflecting plate set on the rear side of a cold-cathode tube, a light diffusion plate set on the front surface of a cold-cathode tube and the like.

Light rays emitted from the backlight device 32 are passed into the display layer DL2 from regions wherein the transparent partition walls W1 are formed and/or a region wherein the transparent developer particles PT have gathered on the side of the substrate S2. The light rays incident on the inside of the display layer DL2 are emitted from a region wherein the transparent developer particles PT have gathered on the side of the substrate S1 to pass through the color filter CF1 toward the observer. The light rays incident on the display layer DL2 are not emitted from a region wherein the light-tight developer particles PS have gathered on the side of the substrate S1.

Thereby an electric field oriented according to the image information of each of the sub-pixels is applied to a region corresponding to the sub-pixel of the display layer DL2 so that a desired color image is formed on the medium MD4 and can be displayed.

In the medium MD4, the light-reflecting film 31 is formed on the top of each of the partition walls W1 opposed to the substrate S1 so that light rays are not emitted from the ends of the partition walls W1 on the side of the substrate S1 toward the observer. Accordingly, color display can be performed with better contrast than when the light-reflecting film 31 is not formed. It is possible to suppress the possibility of displaying a color different from the intended color due to light rays given off from the partition walls W1.

Figure 9A:
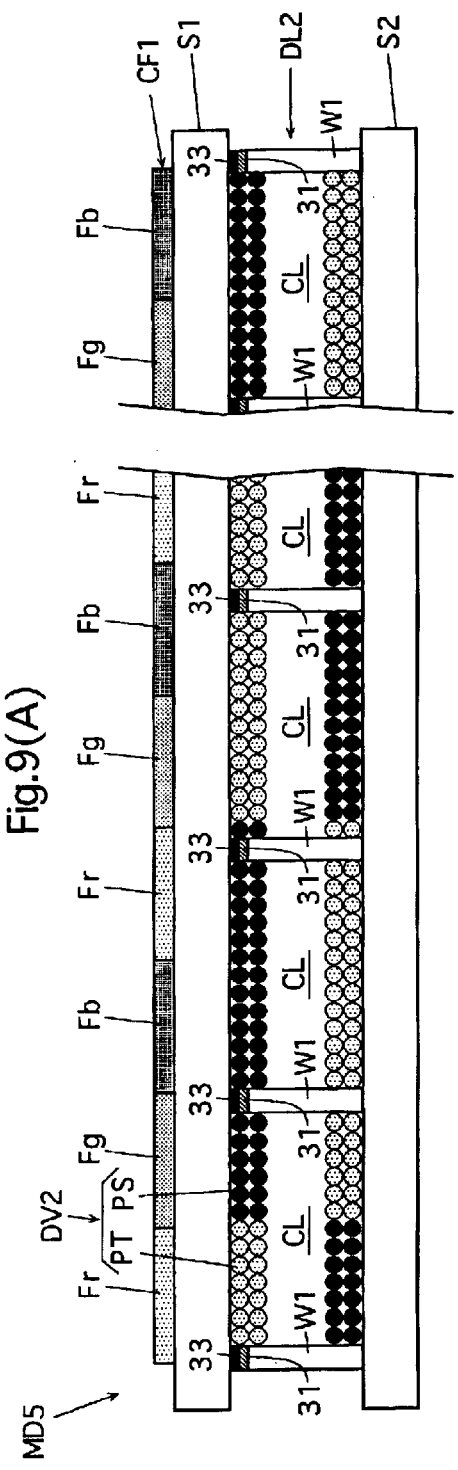
FIG. 9(A) and FIG. 9(B) are schematic sectional views showing additional examples of the developer-including type image display medium.
Figure 9B:
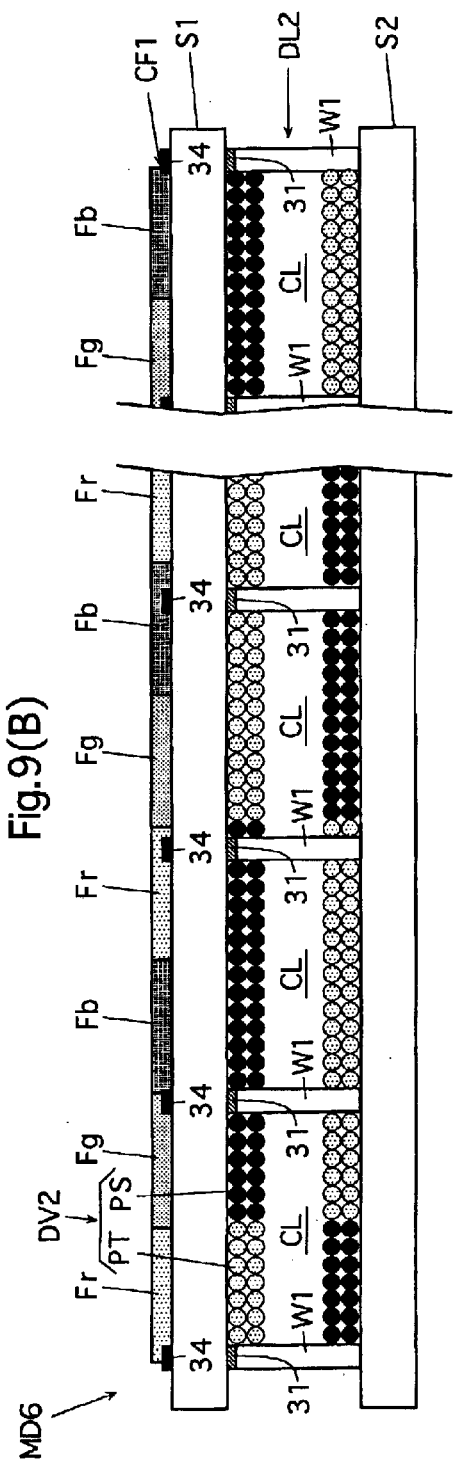

<Image Display Mediums MD5 and MD6 (See FIG. 9(A) and FIG. 9(B))>

Light-absorbing films 33 may be interposed between the light-reflecting films 31 and the substrate S1 as in a medium MD5 of FIG. 9(A). optionally light-absorbing films 34 may be formed in outer surface regions of the substrate S1 corresponding to the light-reflecting films 31 as in a medium MD6 of FIG. 9(B).

In the absence of the light-absorbing films 33 or 34, the light rays incident on the medium MD5 (MD6) from the side of the substrate S1 are partly reflected by the light-reflecting films 31 on the top surface of the partition walls W1. The reflected light rays lower the contrast of displayed image and is likely to display a color different from the intended color. In the presence of the light-absorbing films 33 or 34, such reflection can be suppressed and the contrast of the displayed image can be further improved. Moreover, it is possible to suppress the possibility of displaying a color different from the intended color.

The above-discussed mediums MD1 to MD6 are of the developer-including type. The above-mentioned methods for performing good color display using the color filter can be applied to twist ball type mediums or electrophoresis type mediums if a disadvantage is not entailed.

<Image Display Medium MD7 (See FIG. 10)>

Figure 10:
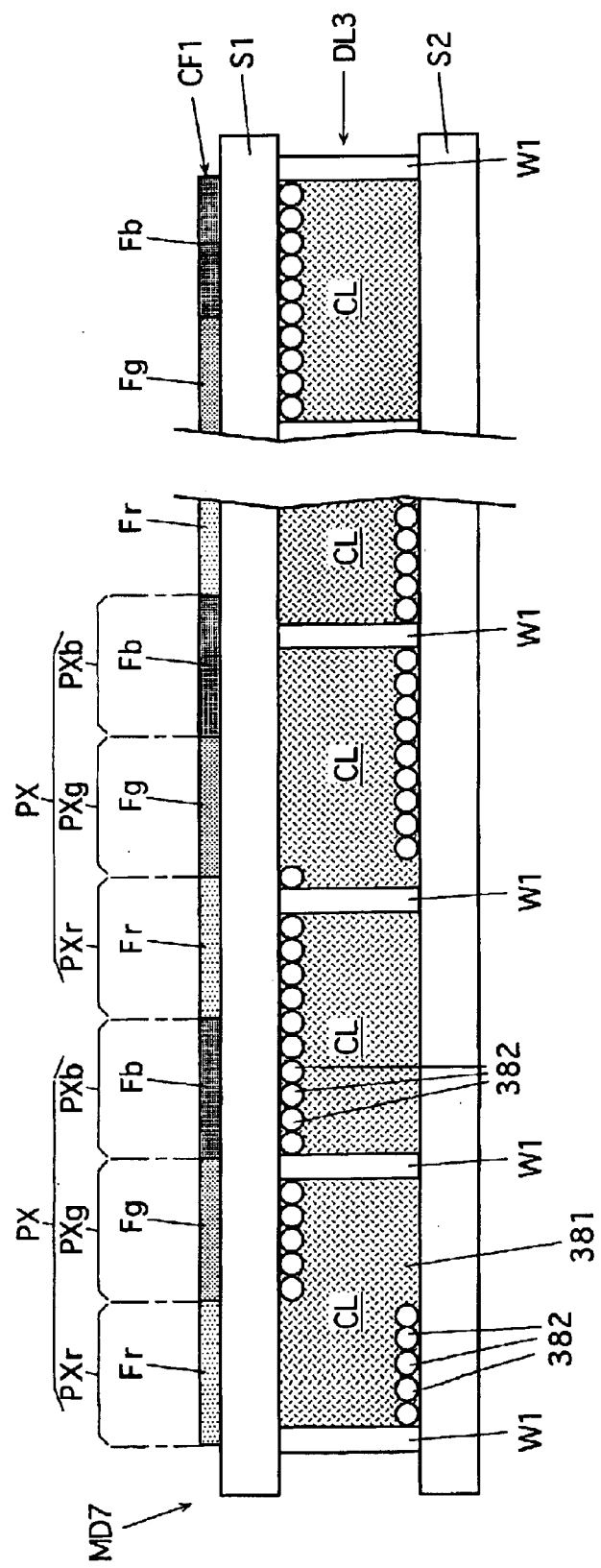
FIG. 10 is a schematic sectional view showing an example of the electrophoresis type image display medium.

FIG. 10 is a schematic sectional view showing an example of the electrophoresis type image display medium. The medium MD7 of FIG. 10 is provided for performing light-reflecting type display. The medium MD7 is substantially identical with the medium MD1 of FIG. 2 except that a display layer DL3 is provided between the substrates instead of the display layer DL1. Like parts having the same function are indicated by like reference symbols.

The display layer DL3 includes an insulating liquid (dispersion medium) 381 and a plurality of developer particles 382 dispersed in the insulating liquid 381 and having an electrophoretic capability (electrophoretic mobility). The developer particles 382 are charged to a specified polarity (positive polarity in this example). The insulating liquid 381 is different in color from the developer particles 382. In this example, the insulating liquid 381 is opaque black, and the developer particles 382 are opaque white. The insulating liquid 381 may be white instead of being black and the developer particles may be black instead of being white.

In the medium MD7, like the medium MD1, the display layer DL3 is partitioned into a plurality of sections with the partition walls W1, and a plurality of cells CL are formed between the substrates.

When images are displayed on the medium MD7, as in forming images on the medium DM1, an electric field oriented according to the image information of each of the sub-pixels is applied to a region corresponding to the sub-pixel of the display layer DL3, whereby the positively charged developer particles 382 are electrophoretically moved in the insulating liquid 381 toward the substrate S1 or S2 according to the orientation of the electric filed to be applied.

In the sub-pixels PXr, PXg and PXb wherein the white developer particles 382 have gathered on the side of the substrate S1 on the observation side, red, green, and blue components are displayed. In the sub-pixels PXr, PXg and PXb wherein the white developer particles 382 have gathered on the side of the substrate S2 on the rear side, black component is displayed anywhere. Thereby an electric field oriented according to the image information of each of the sub-pixels is applied to a region corresponding to the sub-pixel of the display layer DL3 so that a desired color image can be formed on the medium MD7 and can be displayed thereon.

In this electrophoresis type medium MD7, the width of the partition wall W1 is smaller than the width of any of the filter films Fr, Fg, Fb of the color filter CF1 so that the partition wall W1 is unnoticeable in achieving color image display.

Even in such electrophoresis type medium, as in the medium MD2 of FIG. 5, the filter films of the color filter may be allowed not to overlap the partition wall. In this case, the same effect as in the medium MD2 can be achieved. Even in the electrophoresis type medium, as in the medium MD3 of FIG. 6, the substrate itself on the observation side may be a color filter. The same effect can be obtained. In the electrophoresis type medium, the developer particles for reflecting incident light (e.g., white developer particles 382 of medium MD7) may be those having a high light reflectance such as those of FIGS. 7(A) to 7(C). The same effect is obtainable.

When a colorless transparent insulating liquid and light-tight black developer particles are used instead of the opaque black liquid 381 and opaque white developer particles 382 in the electrophoresis type medium MD7, light-transmitting type display can be performed.

An image is formed on the medium by applying an electric field to the display layer of the medium as described above. In performing image recording (image formation) on the medium having the color filter, a color image recorded on the medium (a color image displayed by the medium) would show a different color from the intended color image if the image is not recorded at a proper (accurate) position, in other words, if an electric field oriented according to the image information of each of the sub-pixels is not applied to the display layer of the sub-pixel.

For example, in the medium MD1 having the color filter CF1 comprising filter films Fr, Fg, Fb arranged in a stripe pattern as shown in FIG. 4, the displayed image would show a color different from the desired color if the position of image recording is displaced by a distance corresponding to one sub-pixel in an X direction (a direction orthogonal to the extending direction of filter films) and if an electric field oriented according to the image information of the sub-pixel adjacent to the intended sub-pixel is applied to a region corresponding to the sub-pixel in the display layer. For example, if the position of image recording is displaced by a distance corresponding to one sub-pixel, an attempt to record a red color image on the medium MD1 of FIG. 4 would result in display of blue or green image.

The following description is given in respect of examples of image recording apparatus for recording images on the medium by applying an electric field to the display layer of the medium and method for recording images without displacement of position in the image recording apparatus. The following description is directed mainly to image recording on the above-mentioned medium MD1 of FIG. 1. However, the following image recording apparatuses are capable of recording images on other mediums set out hereinbefore.

<Image Recording Apparatus AP1 (See FIGS. 11 to 13)>

Figure 11:
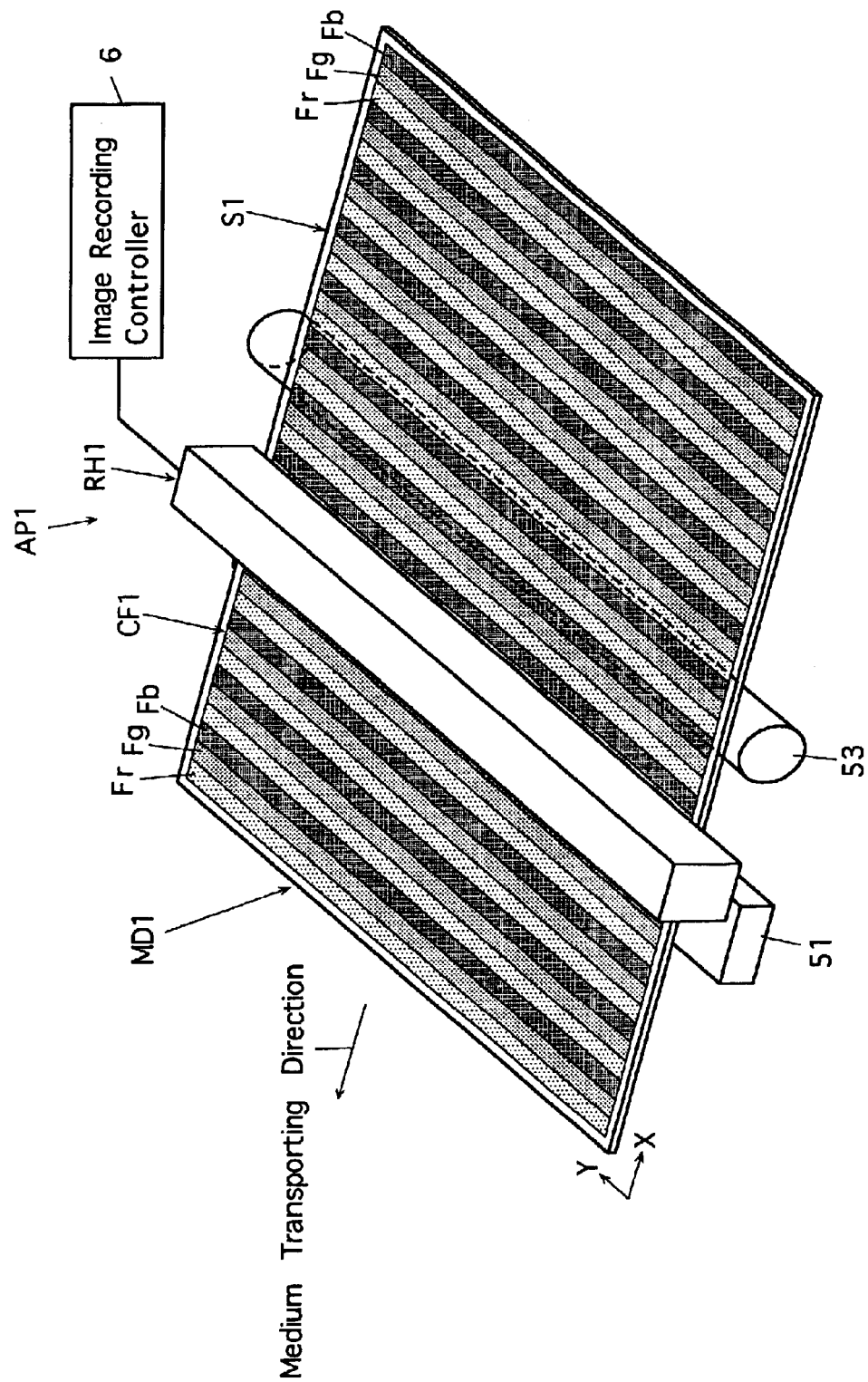
FIG. 11 is a perspective view schematically showing the structure of an example of the image recording apparatus.
Figure 12:
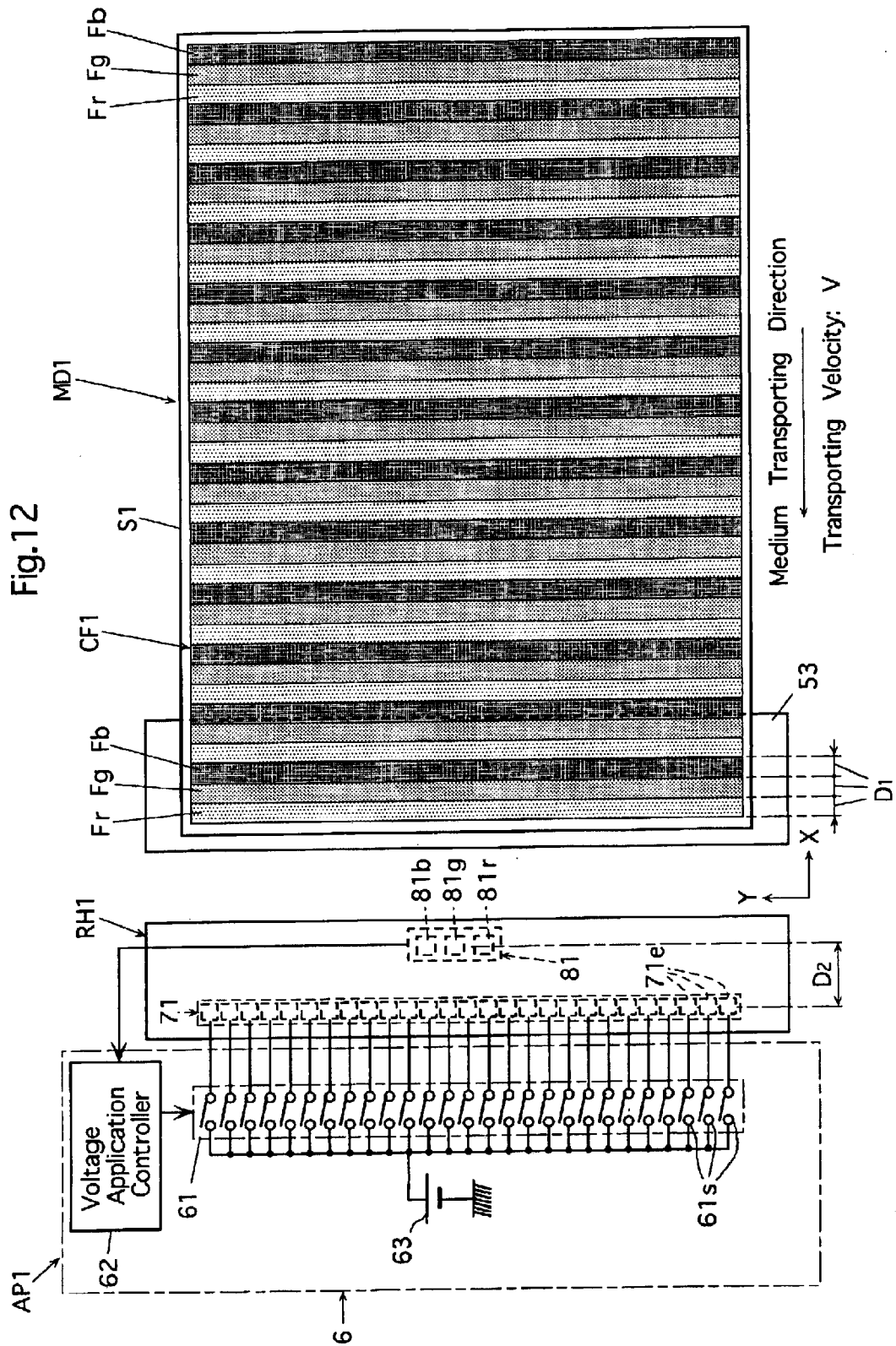
FIG. 12 is a plan view schematically showing the structure of the image recording apparatus of FIG. 11.
Figure 13:
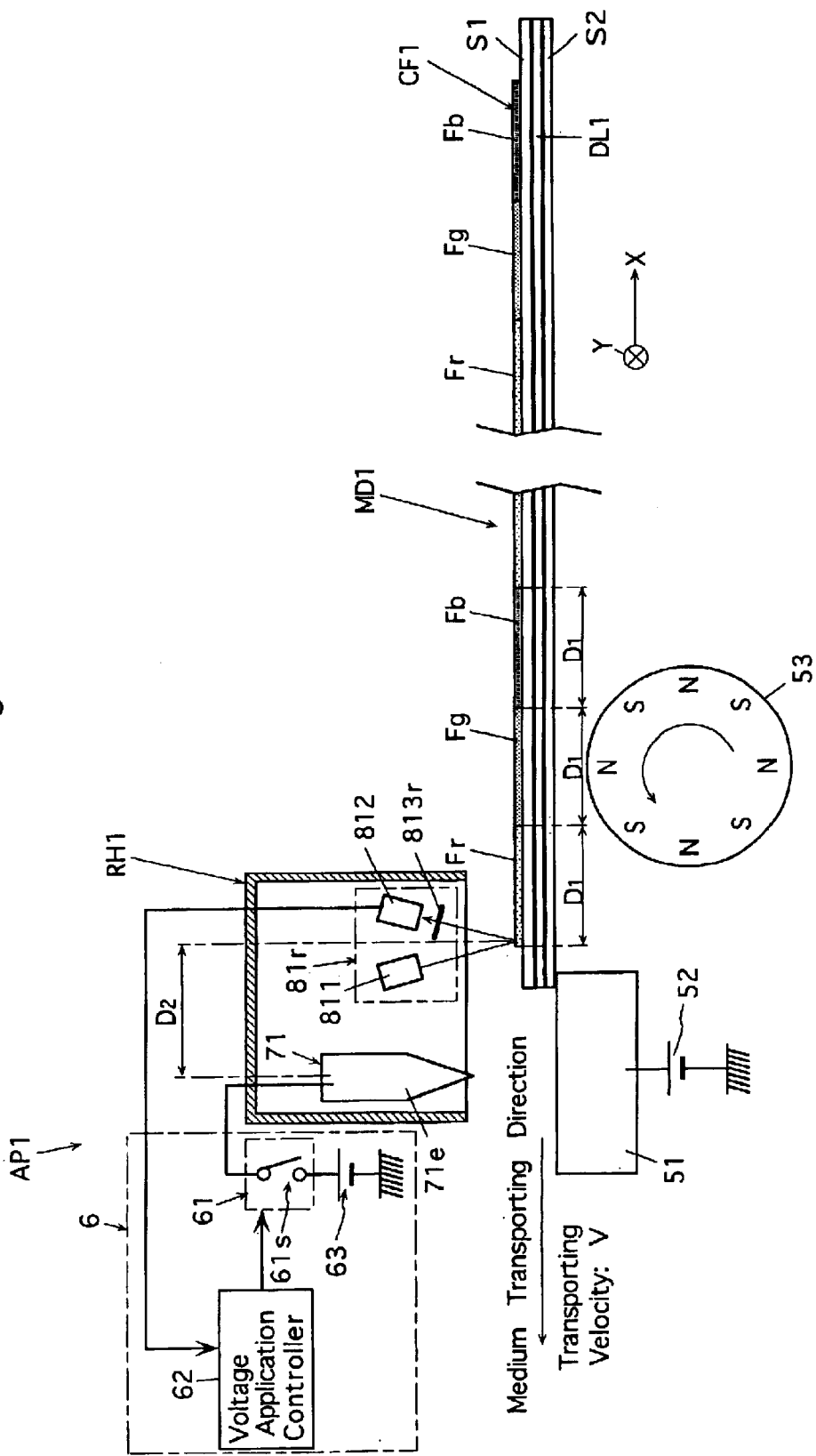
FIG. 13 is a sectional view schematically showing the structure of the image recording apparatus shown in FIG. 11 and FIG. 12.

FIGS. 11, 12 and 13 are a perspective view, a plan view and a sectional view, respectively schematically showing the structure of an example of the image recording apparatus (image forming apparatus). In the image recording apparatus AP1 of FIGS. 11 to 13, image recording is carried out while transporting the medium MD1 in a specified direction at a specified velocity V. The medium MD1 is transported by a pair of transporting rollers (not shown).

The image recording apparatus AP1 is allowed to form an electrostatic latent image corresponding to an image to be recorded on the medium substrate S1 of the medium MD1 (more specifically, on the color filter CF1 of the substrate S1). An electric field is applied to the medium display layer DL1 using an electrical charge (electrostatic latent image charge) constituting the electrostatic latent image to record the image. Optionally the electrostatic latent image may be formed on the substrate S2.

The image recording apparatus AP1 has a recording head RH1 opposed to the medium substrate S1. The recording head RH1 has a multistylus head 71 (see FIG. 2) mounted thereon for forming an electrostatic latent image on the medium substrate by discharging. The multistyrus head 71 is not shown in FIG. 11.

The multistyrus head 71 has a plurality of styrus electrodes 71e aligned in a direction (Y direction) orthogonal to a medium-transporting direction. An electrostatic latent image is formed on the medium substrate S1 by applying a voltage to each styrus electrode 71e to discharge electricity toward the medium MD1 to be transported.

The application of voltage to each styrus electrode 71e is controlled by an image recording controller 6. The controller 6 has voltage application controlling switches 61s connected to styrus electrodes 71e, a voltage application controller 62 for controlling the opening and closing of each switch 61s, and a power source 63 connected to styrus electrodes 71e via the switches 61s.

The voltage application controller 62 is adapted to open or close each switch 61s based on image data of an image to be recorded and to control discharging from each styrus electrode 71e. The image data are inputted into the controller 6 from host equipment (not shown) such as a computer, word processor, image-reader of a copier and the like. Each of the switches 61s is opened or closed according to the image information (image data) of the sub-pixel to which the styrus electrode 71e is opposed. An electrostatic charge (positive polarity charge in this example) is applied to the top of the medium substrate S1 by discharging from the styrus electrode(s) 71e on closing the switch(es) 61s. An electrostatic latent image corresponding to the image to be recorded is formed on the medium substrate S1 by the electrostatic charge given by discharging.

An electric field is applied to a region corresponding to each sub-pixel of the display layer DL1 by the electrostatic latent image charge on the substrate S1 and by a bias electrode 51 opposed to the substrate S2 and having a bias voltage applied thereto. The bias voltage is applied to the bias electrode 51 from a power source 52 (see FIG. 13). The bias voltage is one between a potential in the region on the substrate S1 in which the electrostatic charge has been applied and a potential in the region on the substrate S1 in which the electrostatic charge has not been applied. Thereby an electric field oriented from the substrate S2 to the substrate S1 is applied to a display layer region corresponding to the sub-pixel to which the electrostatic charge has been applied. The developer particles in the display layer DL1 are moved, as described above, according to the orientation of electric field to be applied, whereby a desired image according to the electrostatic latent image is formed on the medium MD1.

A magnet roller 53 is disposed on the upstream side in the medium-transporting direction of the recording head RH1. An oscillating magnetic field is applied to the dry developer in the display layer DL1 by driving to rotate the magnet roller 53 before or at the same time as application of the electric field to the display layer DL1.

The image recording apparatus AP1 has a color photosensor 81 for detecting, e.g., an image recording position (see FIGS. 12 and 13). The photosensor 81 is not shown in FIG. 11. In this example, the photosensor 81 is mounted on the recording head RH1. The photosensor 81 is placed upstream of the multistyrus head 71 (styrus electrodes 71e) by a distance $D_2$ in the medium-transporting direction.

The photosensor 81 has, as shown in FIG. 12, sensor members 81r, 81g and 81b for detecting the red, green and blue filter films Fr, Fg, Fb, respectively of the color filter CF1.

In this example, the sensor member 81r for detecting the red filter film Fr has, as shown in FIG. 13, a light-emitting element 811 for emitting white light rays, a light-receiving element 812 and a red filter 813r. A more quantity of light is obtained, which is emitted from the light-emitting element 811 and reflected by the filer film, and passed into the light-receiving element 812 through red filter film 813r when the sensor member 81r is situated to confront the red filter film Fr than when it is situated to confront the green filter film Fg or blue filter film Fb. Thereby the sensor member 81r can detect whether the photosensor 81 (sensor member 81r) is situated to confront the red filter film Fr. The detected information (detected signal) by the light-receiving element 812 of the sensor member 81r is inputted into the voltage application controller 62. The voltage application controller 62 counts the number of detections as to whether the sensor member 81r confronts the red filter film Fr to detect which red filter film Fr among a plurality of red filter films in the color filter CF1 is confronted by the photosensor 81.

The sensor member 81g for detecting the green filter film Fg has the same structure as that of the sensor member 81r and can detect which green filter film Fg in the color filter CF1 is confronted by the photosensor 81. The sensor member 81b for detecting the blue filter film Fb has the same structure as that of the sensor member 81r and can detect which blue filter film Fb in the color filter CF1 is confronted by the photosensor 81.

As described above, the photosensor 81 is spaced away by the distance $D_2$ from the multistyrus head 71 for image recording (recording of electrostatic latent image) This positional relation is constant. Consequently, the positional relation between the multistyrus head 71 and the filter films Fr, Fg, Fb of the color filter CF1 can be detected by detecting the positional relation between the photosensor 81 and the filter films Fr, Fg, Fb in the above-mentioned manner. The controller 62 can control the image recording position by the multistyrus head 71 based on the positions of filter films Fr, Fg, Fb detected by the photosensor 81. Stated more specifically, the controller 62 can control the image recording timing by the multistyrus head 71 in the following manner based on the timing with which the photosensor 81 detects the filter films Fr, Fg, Fb.

Image recording is performed in the sub-pixels on the red filter film Fr during a period of time from a time $[T_1+D_2/V]$ to a time $[T_1+(D_1+D_2)/V]$ wherein T1 is a time when the red filter film Fr is detected by the photosensor 81, $D_1$ is the width of the filter films Fr, Fg, Fb, and V is the medium-transporting velocity, namely during a period of time that the multistyrus head 71 confronts the red filter film Fr.

Image recording is carried out with a similar timing in the sub-pixels on the green filter film Fg and the sub-pixels on the blue filter film Fb. Thereby the image recording can be performed without displacement of position in each sub-pixel superimposed on the red, green and blue filter films Fr, Fg, Fb in the medium-transporting direction (a direction orthogonal to the extending direction of the filter films).

Image recording is performed by detecting the positions of filter films Fr, Fg, Fb overlaid on the sub-pixels and thus the displacement of image recording position can be more precisely suppressed. Consequently the image recording apparatus AP1 can suppress the disadvantages caused by the displacement of image recording position, namely can suppress the possibility of recorded image (displayed image) showing a color different from the desired color and can form a color image in the desired color.

The photosensor 81 is capable of not only detecting the above-mentioned image recording position (image recording timing), but also detecting the transporting direction of the medium MD1, namely detecting whether the medium having the red filter film Fr at the front side is transported as shown in FIG. 12 or whether the medium having the blue filter film Fb (existing at an end portion on the other side) at the front side is transported. When the medium MD1 is transported in a direction shown in FIG. 12, the red filter film Fr is detected at first by the photosensor 81. On the other hand, when the medium MD1 is transported in the opposed direction, the blue filter film Fb is detected at first. For example, the order of image recording in the medium-transporting direction may be controlled according to the medium-transporting direction. When the medium-transporting direction is reverse to the specified direction (for example, direction shown in FIG. 12), a need for changing the direction of the medium may be recommended to the user.

In this example, an image is recorded with the recording head RH1 disposed in a specified position while transporting the medium MD1. However, optionally an image may be recorded with the medium MD1 disposed in a specified position while transporting the recording head RH1.

In the example described above, the image recording position (image recording timing) is determined by detecting all of the positions of red, green, and blue filter films Fr, Fg, Fb by the photosensor 81. However, the following operation may be done instead.

For example, only the position of the red filter film Fr is successively detected, and image recording is carried out in the sub-pixels on the red filter film Fr in the same manner as above. Image recording is executed in the sub-pixels on the green filter film Fg during a period of time from a time $[T_1+(D_1+D_2)/V]$ to a time $[T_1+(2·D_1+D_2)/V]$ wherein T1 is a time when the red filter film Fr adjacent to the green filter film Fg on the upstream side is detected, namely while the multistyrus head 71 confronts the green filter film Fg. Likewise, image recording is executed in the sub-pixels on the blue filter film Fb during a period of time from a time $[T_1+(2·D_1+D_2)/V]$ to a time $[T_1+(3·D_1+D_2)/V]$ wherein T1 is a time when the red filter film Fr is detected, namely while the multistyrus head 71 confronts the blue filter film Fb. That is, in this case, the positions of the green and blue filter films are indirectly detected by directly detecting the positions of the red filter films.

Optionally only the position of red filter film Fr most downstream may be detected and the image recording timing in the sub-pixels on each filter film (in other words, positions of the other filter films) may be determined according to the distance between the most downstream red filter film Fr and the filter film superimposed on the sub-pixels in which image recording is to be executed, the medium-transporting velocity and the width of the filter film.

That is, in this case, the positions of the filter films other than the most downstream red filter film are indirectly detected by directly detecting the position of the most downstream red filter film.

<Image Recording Apparatus AP2 (See FIG. 14)>

Figure 14:
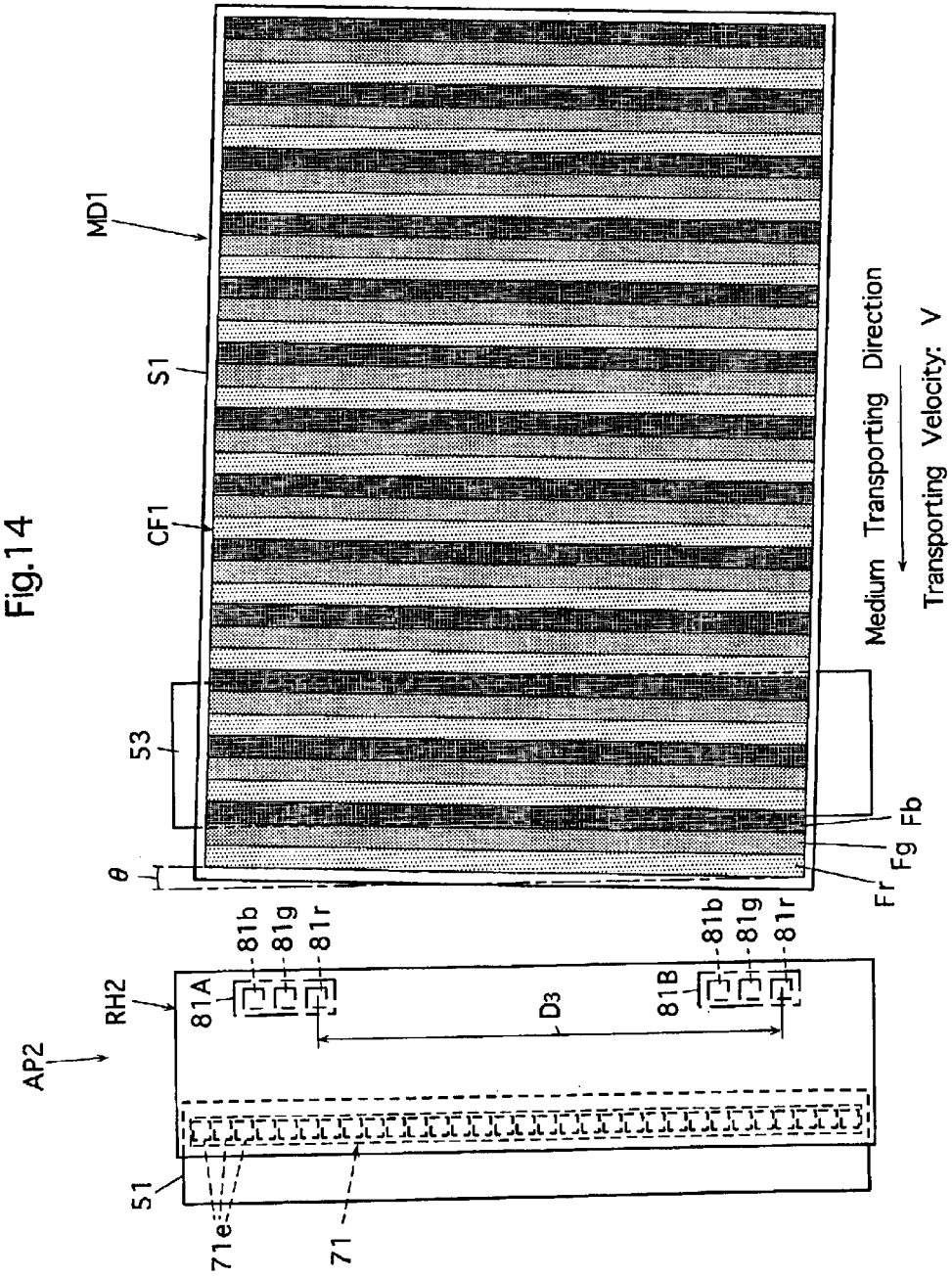
FIG. 14 is a schematic plan view showing another example of the image recording apparatus.

FIG. 14 is a plan view schematically showing another example of the image recording apparatus. An image recording apparatus AP2 of FIG. 14 is substantially identical with the image recording apparatus AP1 of FIG. 12 except that two color photosensors are mounted on the recording head. In FIGS. 12 and 14, like parts having the same function are indicated by like reference symbols.

Each of two photosensors 81A, 81B mounted on the recording head RH2 is the same as the photosensor 81. The two photosensors 81A, 81B are aligned in a direction in parallel with the alignment direction of the styrus electrodes 71e (direction orthogonal to the medium-transporting direction). The photosensors 81A, 81B are disposed as spaced away from each other by a distance $D_3$. The photosensors 81A, 81B are situated to confront both ends of the color filter CF1 of the medium MD1 to be transported. In this example, both of photosensors 81A, 81B are mounted on the recording head RH2 but are not necessarily mounted thereon if disposed in a specified positional relation with the recording head RH2 (multistyrus head 71).

The photosensors 81A, 81B can detect whether the medium MD1 is being diagonally transported. When the medium MD1 is being diagonally transported as shown in FIG. 14, a time lag occurs according to an oblique angle θ between the timing of detecting the red filter film Fr by the photosensor 81A and the timing of detecting the red filter film Fr by the photosensor 81B. Thereby the oblique movement of the medium MD1 can be detected.

Oblique angle $θ=\tan^{-1}(V·Δt/D_3)$ wherein V is a medium-transporting velocity and Δt is a time shift in the timing of detecting the red filter film Fr by each of photosensors 81A and 81B.

When the oblique movement of the medium is detected, image recording can be executed without displacement of position despite the oblique movement of the medium by correcting the mistiming of image recording according to the oblique angle θ using each styrus electrode 71e of the multistyrus head 71. When the oblique angle is large, the user may be advised of a need to correct the oblique angle of the medium before recording images.

<Image Recording Apparatus AP3 (See FIG. 15)>

Figure 15:
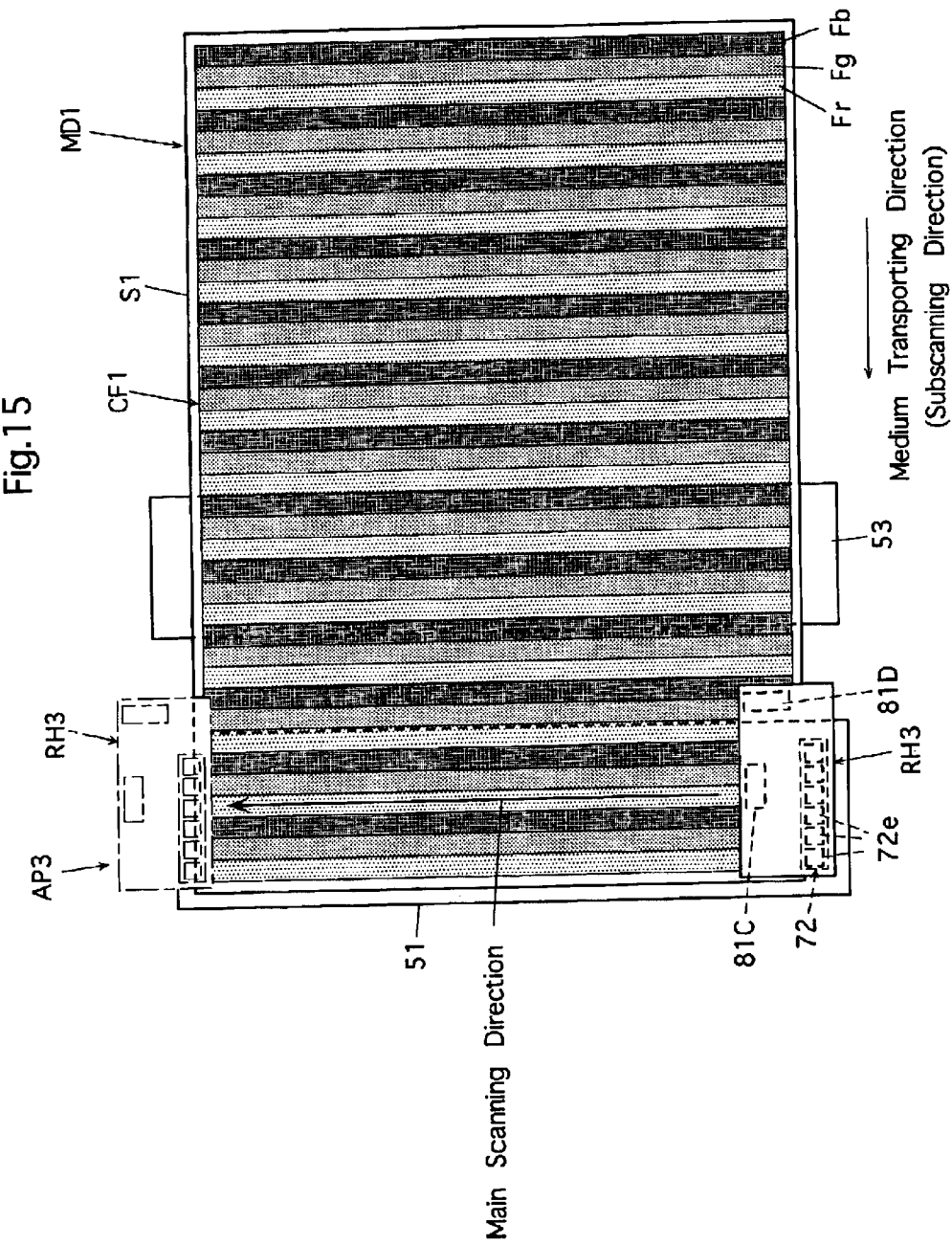
FIG. 15 is a schematic plan view showing a further example of the image recording apparatus.

FIG. 15 is a plan view schematically showing a further example of the image recording apparatus. An image recording apparatus AP3 of FIG. 15 is substantially identical with the image recording apparatus AP1 of FIG. 12 except that a recording head RH3 is used in place of the recording head RH1. Like parts having the same function are indicated by like reference symbols.

The recording head RH3 has a multistyrus head 72 mounted thereon and including a plurality (6 in this example) of styrus electrodes 72e arranged in parallel with the medium-transporting direction.

Image recording is executed to an extent corresponding to six sub-pixel lines by the multistyrus head 72 while moving the recording head RH3 in the main scanning direction. After executing the image recording to an extent corresponding to the six sub-pixel lines, the medium MD1 is transported in the subscanning direction by a distance corresponding to the six sub-pixel lines. Then the recording head RH3 is returned to the original recording-initiating position in the main scanning direction to carry out image recording to an extent corresponding to subsequent six sub-pixel lines. Then, image recording is conducted in the same manner to cover all sub-pixels.

The recording head RH3 includes a photosensor 81C mounted thereon downstream of the multistyrus head 72 in the main scanning direction and a photosensor 81D mounted thereon upstream of the multistyrus head 72 in the subscanning direction. The photosensors 81C, 81D are identical with the photosensor 81. The photosensors 81C, 81D are both held in a specified positional relation with the multistyrus head 72.

The multistyrus head 72 and filter films Fr, Fg, Fb of the color filter CF1 are positioned in the subscanning direction based on the positional information of the filter films Fr, Fg, Fb to be detected by the photosensor 81D, thereby making it possible to suppress the displacement of recording position in the subscanning direction (direction orthogonal to the lengthwise extending direction of filter films Fr, Fg, Fb of the color filter CF1)

The photosensor 81C is allowed to detect the recording initiating position and the recording finishing position in the main scanning direction when executing image recording while moving the recording head RH3 in the main scanning direction, whereby displacement of recording position in the main scanning direction may be suppressed.

In the image recording apparatus AP1 to AP3, the recording position (image recording timing) is determined by directly detecting the position of filter films Fr, Fg, and/or Fb of the color filter. Optionally the position of filter films may be indirectly detected by detecting the component(s) or part(s) on the medium held in a specified relation with the filter films.

Figure 16:
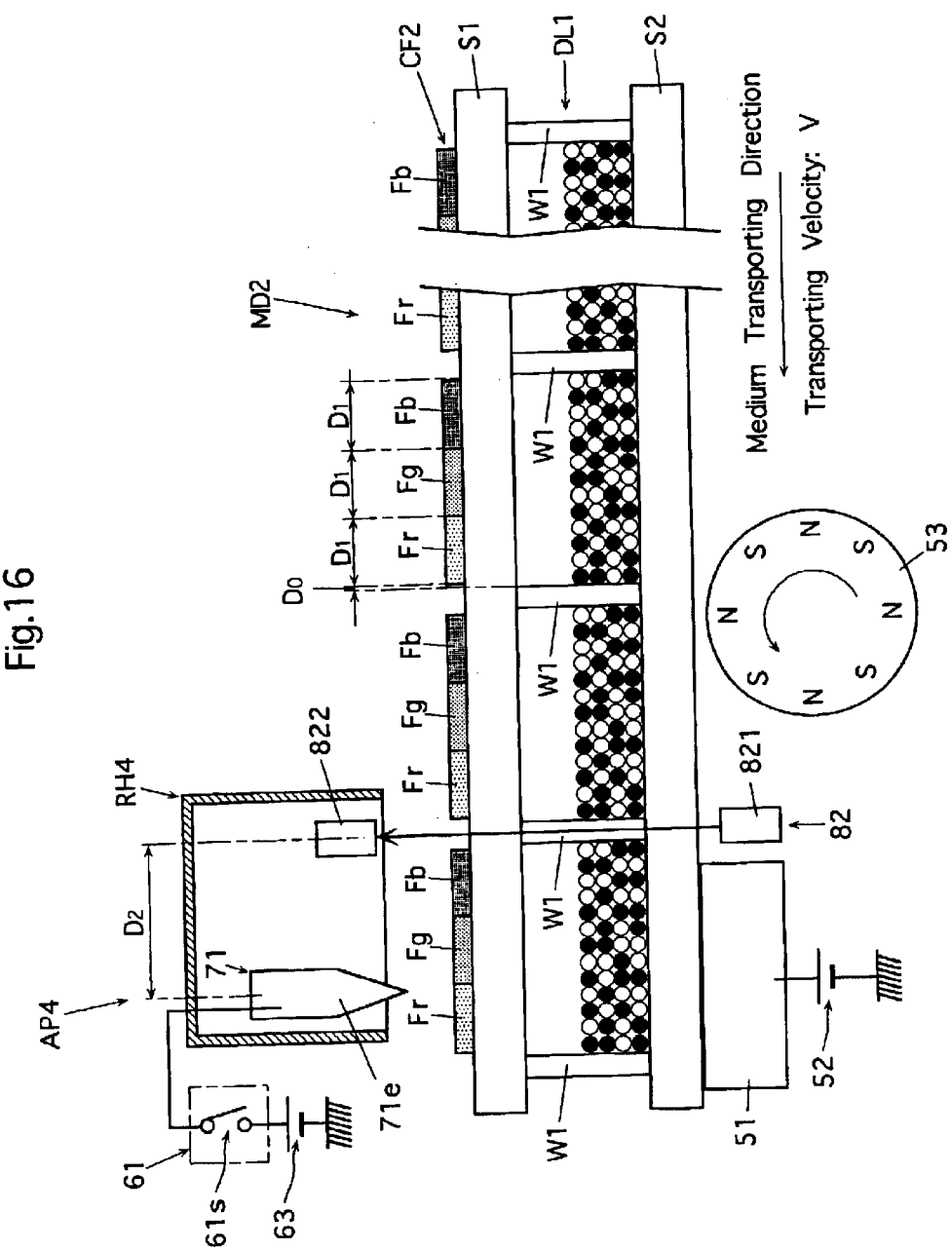
FIG. 16 is a schematic sectional view showing a still further example of the image recording apparatus.

For example, since a constant positional relation exists between the partition walls W1 and the filter films Fr, Fg, Fb of the color filter CF2 in the medium MD2 of FIG. 5, the position of the filter films can be indirectly detected by detecting the position of the partition wall(s) W1. In the medium MD2, the partition wall W1 is spaced away by a distance $D_0$ from the red filter film adjacent to the partition wall W1 as shown in FIG. 16. Optionally the distance $D_0$ may be 0.

<Image Recording Apparatus AP4 (See FIG. 16)>

In an image recording apparatus AP4 of FIG. 16, image recording is performed while determining the image recording site by detecting the position of the partition wall W1 of the medium MD2. The image recording apparatus AP4 is substantially identical with the image recording apparatus AP1 of FIG. 13 except that a photosensor 82 is used instead of the photosensor 81 in the image recording apparatus AP1. In FIGS. 13 and 16, like parts having the same function are indicated by like reference symbols. In the image recording apparatus AP4, image recording is carried out while transporting the medium MD2 in a specified direction at a specified velocity V. A recording head RH4 having a multistyrus head 71 mounted thereon and the photosensor 82 are disposed at specified positions.

The photosensor 82 has a light-emitting element 821 confronting the substrate S2 and a light-receiving element 822 confronting the substrate S1. When the photosensor 82 stands face to face with the partition wall W1 as shown in FIG. 16, the light rays emitted from the light-emitting element 821 are transmitted through the transparent substrate S2, transparent partition wall W1 and transparent substrate S1 and are passed into the light-receiving element 822. On the other hand, when the photosensor 82 is situated face to face with a region corresponding to a cell CL, the light rays given off from the light-emitting element 821 are intercepted by opaque developer particles Pw and Pk, consequently failing to reach the light-receiving element 822. Thereby the photosensor 82 can detect the position of the partition wall W1.

If $T_2$ represents a time at which the upstream end of the partition wall W1 is detected by the photosensor 82, image recording is executed with the following timing by the multistyrus head 71 in each sub-pixel on each filter film of the color filter CF2.

Image recording is executed in each sub-pixel on the red filter film Fr during a period of time from a time $[T_2+(D_2+D_4)/V]$ to a time $[T_2+(D_1+D_2+D_4)/V]$ wherein $D_1$ is the width of the filter films Fr, Fg, Fb, and $D_2$ is a distance between the photosensor 82 and the multistyrus head 71, namely while the multistyrus head 71 confronts the red filter film Fr.

Image recording is performed in each sub-pixel on the green filter film Fg during a period of time from a time $[T_2+(D_1+D_2+D_4)/V]$ to a time $[T_2+(2 \cdot D_1+D_2+D_4)/V]$, namely while the multistyrus head 71 confronts the green filter film Fg.

Image recording is carried out in each sub-pixel on the blue filter film Fb during a period of time from a time $[T_2+(2 \cdot D_1+D_2+D_4)/V]$ to a time $[T_1+(3 \cdot D_1+D_2+D_4)/V]$, namely while the multistyrus head 71 confronts the blue filter film Fb.

When the image recording position (image recording timing) is determined based on the position of the partition wall W1 in this way, image recording can be done at a suitable position and a color image in the desired color can be recorded.

Figure 17A:
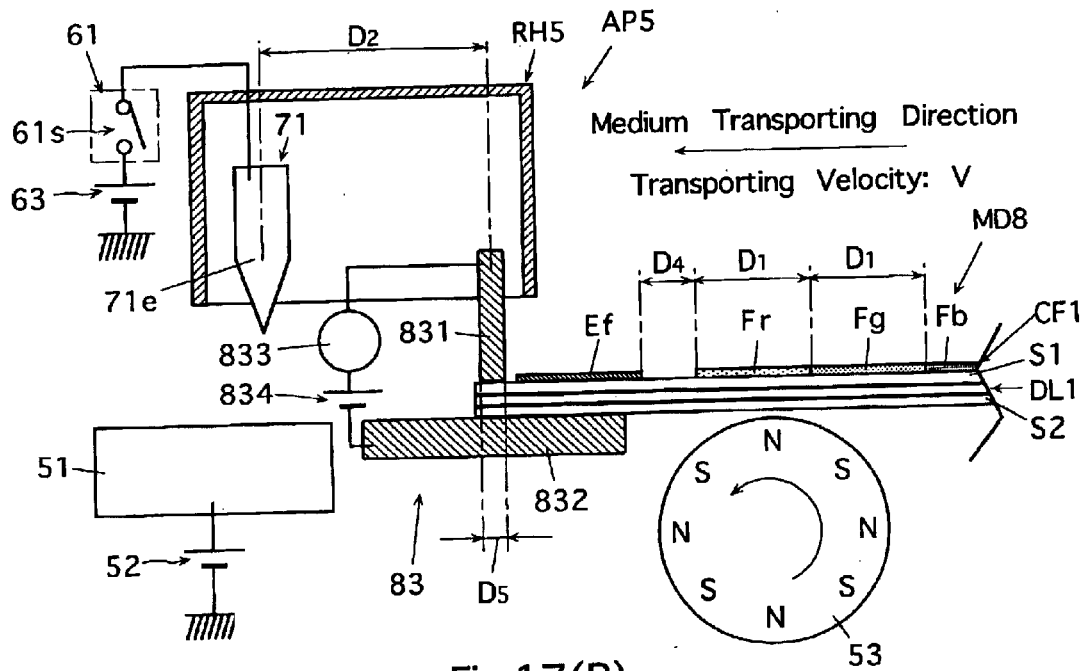
FIG. 17(A) and FIG. 17(B) are schematic sectional views showing other example of the image recording apparatus.
Figure 17B:
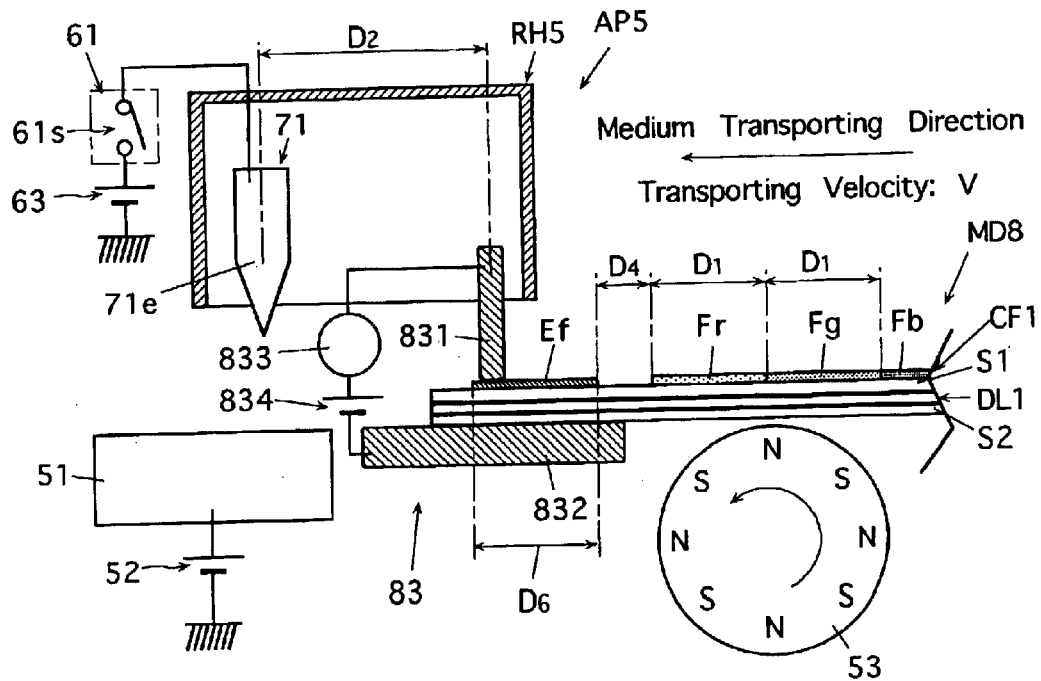

<Image Display Medium MD8, and Image Recording Apparatus AP5 (See FIGS. 17(A) and 17(B))>

FIGS. 17(A) and 17(B) are schematic sectional views showing other examples of the image display medium and image recording apparatus.

An image display medium MD8 of FIGS. 17(A) and 17(B) is substantially the same as the image display medium MD1 of FIG. 2 except that a float electrode Ef is formed on the substrate S1. Like parts having the same function are indicated by like reference symbols. The float electrode Ef is formed as spaced away from the filter film Fr by a distance $D_4$.

The image recording apparatus AP5 of FIGS. 17(A) and 17(B) is substantially the same as the image recording apparatus AP1 of FIG. 12 except that an electrostatic capacity detector 83 is provided in place of the photosensor 81. Like parts having the same function are indicated by like reference symbols. The electrostatic capacity detector 83 has a positioning electrode 831 opposed to the substrate S1 and a counter electrode 832 opposed to the substrate S2. A direct current power source 834 is connected to the electrodes 831, 832 via an ammeter 833.

An electrostatic capacity $C_B$ (apparent electrostatic capacity of the medium between the electrodes) between the positioning electrode 831 and the electrode 832 when the electrode 831 is in contact with the float electrode Ef on the substrate as shown in FIG. 17(B) is different from an electrostatic capacity $C_A$ between the electrode 831 and the electrode 832 when the electrode 831 is out of contact with the float electrode Ef as shown in FIG. 17(A). The ratio of electrostatic capacities: $C_A/C_B=D_5/D_6$ wherein $D_5$ is the width of the positioning electrode 831 and $D_6$ is the width of the float electrode Ef.

Due to a difference between the electrostatic capacities $C_A$ and $C_B$, the charge quantity flowing into the positioning electrode 831 is changed when the positioning electrode 831 is brought from a state of lying out of contact with the float electrode Ef to a state lying in contact therewith or when the positioning electrode 831 is brought from a state of lying in contact therewith to a state lying out of contact therewith. Therefore the positions of upstream end and downstream end of float electrode Ef can be detected based on a current value detected by the ammeter 833.

As is the case with the image recording position (image recording timing) to be determined based on the position of the partition wall W1 in the image recording apparatus AP4, a proper image recording position (image recording timing) can be detected based on the position of upstream end of float electrode Ef (time when the upstream end of float electrode Ef is detected), the distance $D_4$ between the upstream end of float electrode Ef and the downstream end of the filter film Fr, the width $D_1$ of the filter film, the distance $D_2$ between the positioning electrode 831 and the multistyrus head, and the medium-transporting velocity V.

Figure 24A:
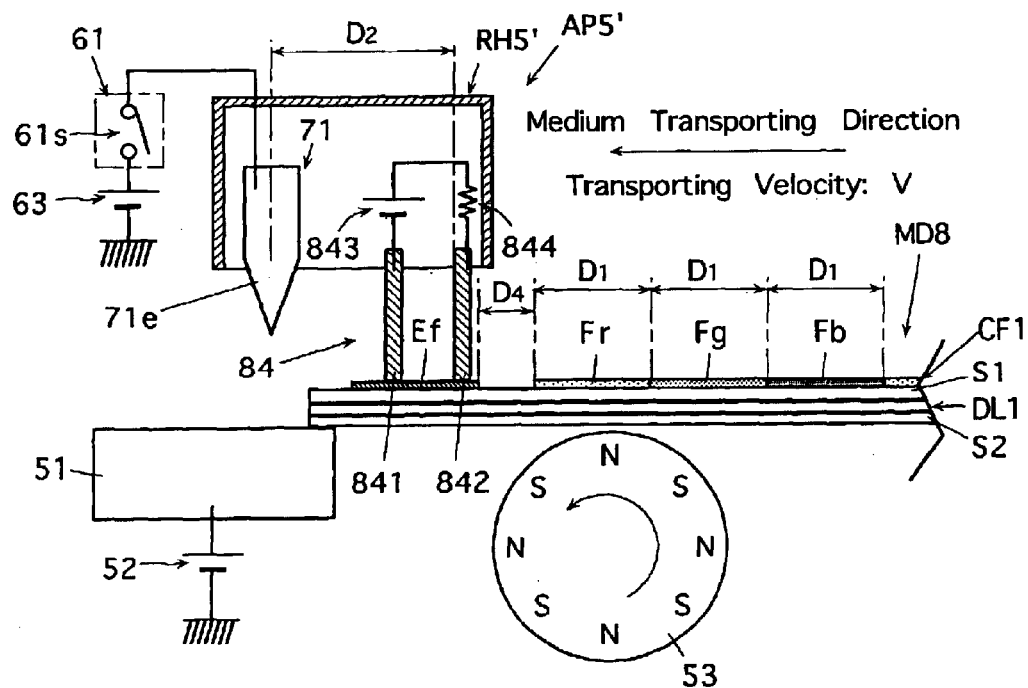
FIG. 24(A) and FIG. 24(B) are schematic sectional views showing other example of the image recording apparatus.
Figure 24B:
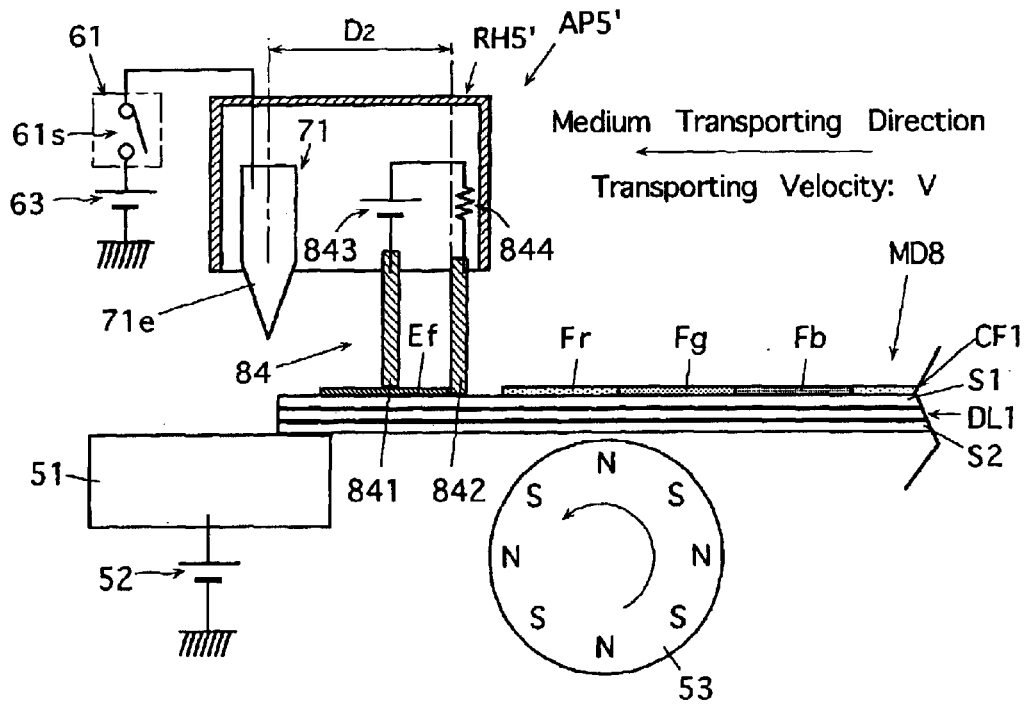

<Image Recording Apparatus AP5' (See FIGS. 24(A) and 24(B))>

The position of the float electrode Ef in the medium MD8 can be detected also by a detector 84 shown in FIGS. 24(A) and 24(B) instead of the detector 83.

The detector 84 has two electrodes 841, 842 disposed as spaced away from each other in a medium-transporting direction by a specified distance according to the width of the float electrode Ef. More specifically, the electrodes 841, 842 are spaced away by a specified distance to attain simultaneous contact with the float electrode Ef as shown in FIGS. 24(A).

A state of conduction between the electrodes 841 and 842 is different between when the electrodes 841 and 842 are in simultaneous contact with the float electrode Ef as shown in FIG. 24(A) and when at least one of the electrodes 841, 842 is not in contact with the float electrode Ef as shown in FIG. 24(B). Consequently the position of the float electrode Ef can be detected by detecting the absence or presence of conduction between the electrodes 841, 842. The conducting state between the electrodes 841, 842 can be detected, for example, by the presence or absence of electric current passing in a circuit including a direct current power source 843 and a resistor 844, respectively connected in series to these electrodes.

In the image recording apparatus AP5' having the detector 84, a proper image recording position (image recording timing) can be detected in the same manner as above based on a distance $D_2$ between the electrode 842 and the multistyrus head 71.

<Image Display Medium MD9 and Image Recording Apparatus AP6 (See FIGS. 18 and 19)>

Figure 19:
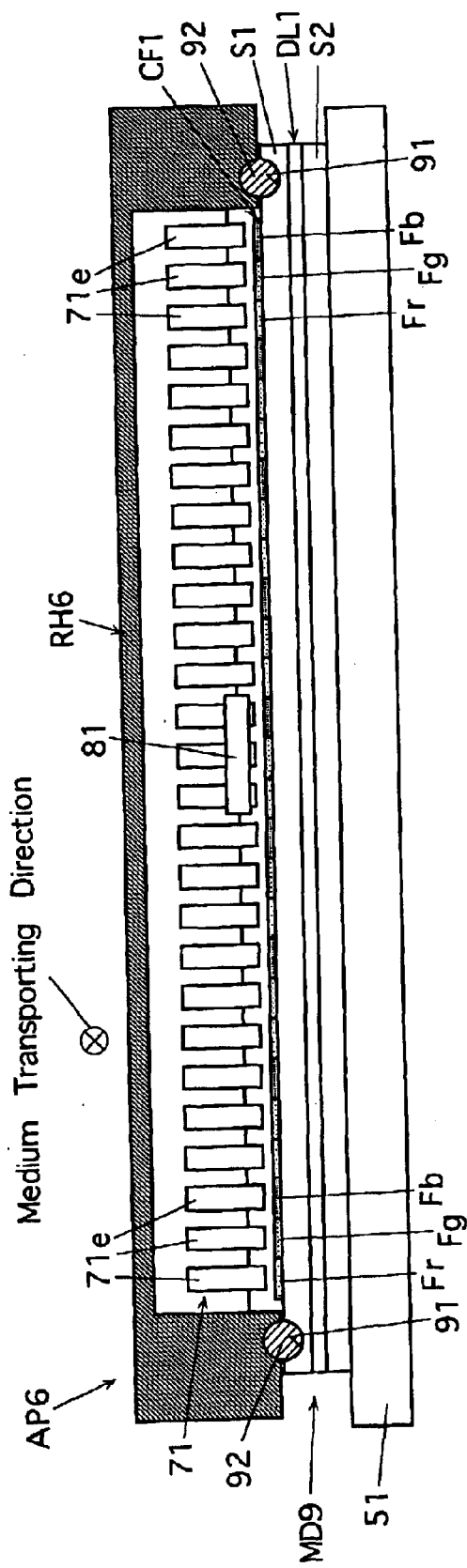
FIG. 19 is a schematic sectional view showing the image display medium and the image recording apparatus shown in FIG. 18.

FIGS. 18 and 19 are a perspective view and a sectional view, respectively schematically showing the structures of further examples of the image display medium and image recording apparatus.

An image display medium MD9 of FIGS. 18 and 19 is substantially the same as the image display medium MD1 of FIG. 2 except that grooves 91 are formed in the substrate S1. Like parts having the same function are indicated by like reference symbols. Two grooves 91 are formed in the substrate S1. Each of the grooves 91 extends in the same direction as the extending direction of the filter films Fr, Fg, Fb of the color filter CF1. The grooves 91 and the filter films Fr, Fg, Fb have a specified positional relation with each other. Each groove 91 is semispherical in section.

The image recording apparatus AP6 of FIGS. 18 and 19 is substantially the same as the image recording apparatus AP1 of FIG. 12 except that a recording head RH6 has convex portions 92. The recording head RH6 has the multistyrus head 71 and the photosensor 81 mounted thereon like the recording head RH1 of the apparatus AP1 (see FIG. 19). FIG. 18 illustrates the recording head RH6 in an alternate long and short dash line for better understanding. The multistyrus head 71 and the photosensor 81 are not shown in FIG. 18.

The convex portions 92 formed in the recording head RH6 are semispherical in section and are engageable (fittable) in the grooves 91 formed in the medium. The recording head RH6 has the two convex portions formed for each groove 91 of the medium. The two convex portions 92 formed for the same groove 91 are aligned in a direction in parallel with the medium-transporting direction.

In the image recording apparatus AP6, the convex portions 92 of the recording head RH6 are engaged in the grooves 91 of the medium MD9, whereby each of filter films Fr, Fg, Fb of the color filter CF1 can be positioned in register with each of styrus electrodes 71e mounted on the recording head RH6. The convex portions 92 bearing a specified positional relation with the styrus electrodes 71e are engaged in the grooves 91 bearing a specified positional relation with the filter films, whereby each of the filter films Fr, Fg, Fb and each of the styrus electrodes 71e are positioned in a proper positional relation with each other.

In executing image recording, the medium MD9 is transported while guiding the grooves 91 of the medium MD9 by the convex portions 92 of the recording head RH6. Thereby image recording can be done by each styrus electrode 71e while retaining a proper positional relation between each of filter films Fr, Fg, Fb and each styrus electrode 71e. Due to this structure, the image recording apparatus AP6 can prevent displacement of position in a direction orthogonal to the extending direction of the filter films so that a color image can be recorded in the intended color on the medium MD9. The photosensor 81 is used to detect the recording initiating position and the recording finishing position in the medium-transporting direction.

The sectional shape of each of the grooves to be formed in the medium may be triangular, quadrangular or otherwise instead of being semispherical. A convex portion in a shape corresponding to the sectional shape of the groove in the medium may be formed in the recording head. Optionally a convex portion may be formed in the medium and a groove engageable with the convex portion may be formed in the recording head, instead of forming the groove in the medium and forming a convex portion engageable with the groove in the recording head.

In the above-described image recording apparatuses, image recording is carried out by discharging from the styrus electrodes. However, the image recording methods are not limited to the method.

Other Methods are Available.

<Image Display Medium MD10 and Image Recording Apparatus AP7 (See FIG. 20)>

Figure 20:
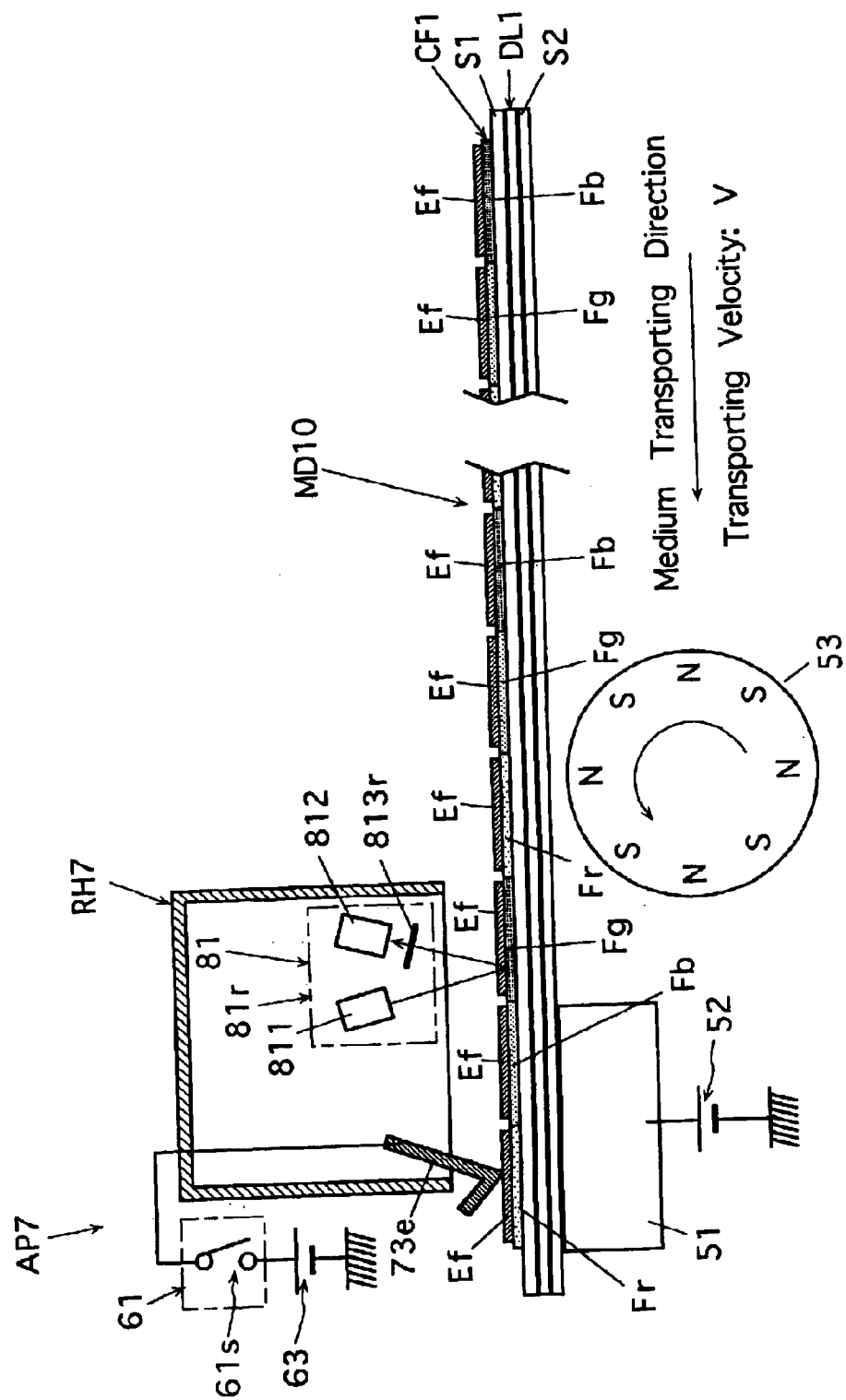
FIG. 20 is a schematic sectional view showing other examples of the image display medium and the image recording apparatus.

FIG. 20 is a sectional view schematically showing still further examples of the image display medium and image recording apparatus. An image display medium MD10 of FIG. 20 is substantially the same as the image display medium MD1 of FIG. 2 except that float electrodes Ef corresponding to the sub-pixels are formed on the color filter CF1. Like parts having the same function are indicated by like reference symbols. The float electrodes Ef are transparent and are formed of ITO (Indium Tin Oxide) in this example.

The image recording apparatus APF of FIG. 20 is substantially identical with the image recording apparatus AP1 of FIG. 12 except that recording electrodes 73e are used in place of the styrus electrodes 71e. Like parts having the same function are indicated by like reference symbols. A recording head RH7 has a plurality of recording electrodes 73e mounted thereon as arranged in a direction orthogonal to the medium-transporting direction In the image recording apparatus AP7, an electrostatic latent image is formed on the medium MD10 by injecting an electrical charge into the float electrode(s) Ef from the recording electrode(s) 73e. Using the electrostatic latent image charge, as in the image recording apparatus AP1, an electric field oriented according to the image information of each of the sub-pixels is applied to a region corresponding to the sub-pixel in the display layer to achieve image recording. The position of electrical charge injection (charge-injection timing) into the float electrodes EF by the recording electrodes 73e (charge-injection timing) is controlled based on the position of the filter films Fr, Fg, Fb detected by the photosensor 81, whereby image recording can be accomplished without displacement of position.

<Image Recording Apparatus AP8 (See FIG. 21)>

Figure 21:
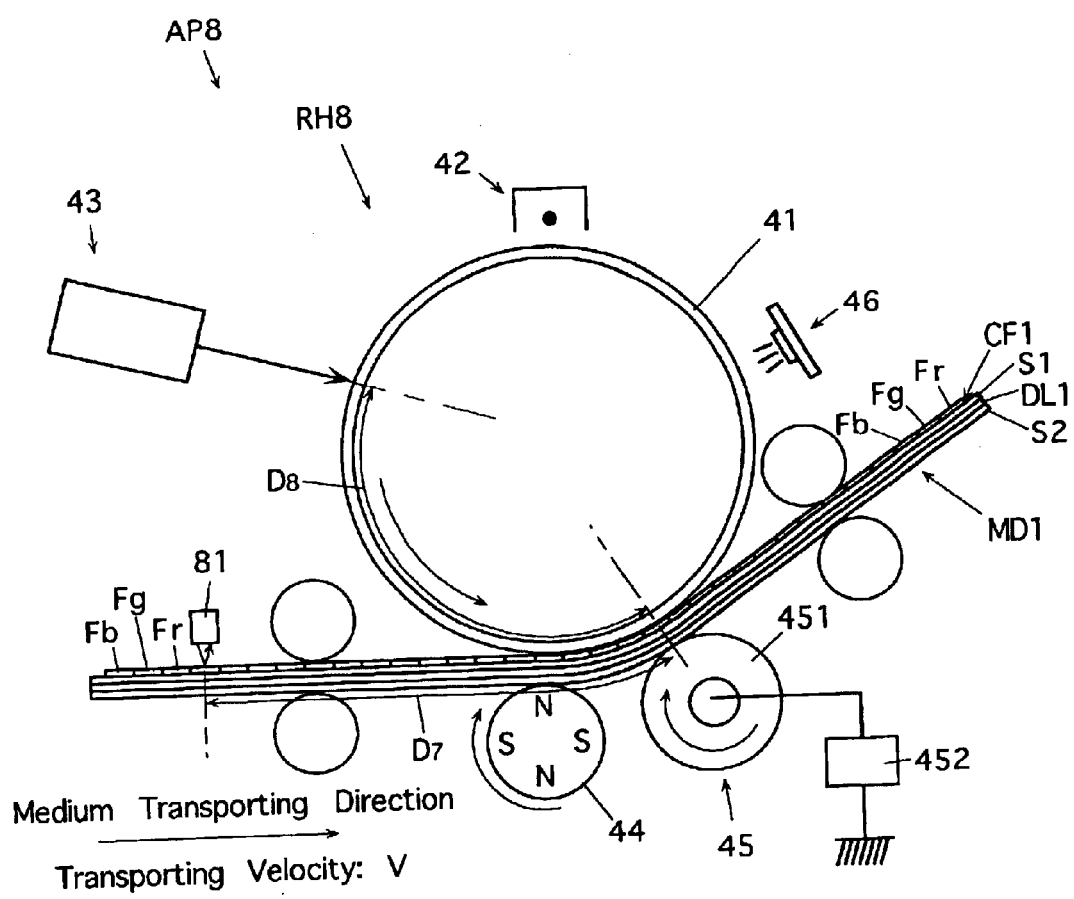
FIG. 21 is a schematic sectional view showing a further example of the image recording apparatus.

FIG. 21 is a diagram schematically showing the structure of another example of the image recording apparatus. In the image recording apparatus AP8 of FIG. 21, image recording is executed by a recording head RH8 including a drum-shaped phtosensitive member 41.

Around the phtosensitive member 41 are a charger 42, a laser exposing device 43, a magnet roller 44, a bias voltage applying device 45 and an erasing device 46.

In the image recording apparatus AP8, image recording is carried out in the following manner on the medium MD1 transported at a velocity V via a specified route. A surface of the phtosensitive member 41 to be driven to rotate counter-clockwise in the figure is uniformly charged by the charger 42. The phtosensitive member 41 is driven to rotate at a peripheral velocity V which is the same as the medium-transporting velocity. In this example, the phtosensitive member 41 is charged to a surface potential Vo of about −800 V.

Thereafter the surface of charged phtosensitive member is exposed to laser beams by the laser exposing device 43 according to an image to be recorded. The potential of a laser-irradiated surface region of the photosensitive member is reduced. In this example, the surface of the phtosensitive member has a potential Vi decreased to about −50V. Thereby an electrostatic latent image corresponding to the image to be recorded is formed on the phtosensitive member 41.

The medium MD1 is transported between the phtosensitive member 41 bearing the electrostatic latent image and the magnet roller 44 and further between the phtosensitive member 41 and a bias roller 451 of the bias voltage applying device 45. An oscillating magnetic field is applied to the dry developer of the medium MD1 opposed to the roller 44 by the rotation of the magnet roller 44. The dry developer is stirred and oscillated by the oscillating magnetic field.

A bias voltage (−400V in this example) is supplied from a power source 452 to the bias roller 451 of the bias voltage applying device 45. Thereby an electric field oriented in the direction from the substrate S2 to the substrate S1 is applied to a display layer region of the medium opposed to a surface region of the phtosensitive member having a potential Vo (about −800V in this example). An electric field oriented in the direction from the substrate S1 to the substrate S2 is applied to a display layer region of the medium opposed to a surface region of the phtosensitive member having a potential Vi (about −50V in this example). Thereby an image in the desired pattern is recorded on the medium. Thereafter residual electric charge is erased from the surface of the phtosensitive member by irradiation of light rays from the erasing device 46 in order to allow the apparatus to make ready for the next image recording.

The image recording apparatus AP8 is provided with the color photosensor 81 for detecting the positions of the filter films of the color filter CF1. The color photosensor 81 is placed on the upstream side of an image recording region wherein the bias roller 451 confronts the phtosensitive member 41. The image recording position is controlled in the following manner based on the positions of filter films detected by the photosensor 81.

The sub-pixels on the red filter film reaches the image recording region after a lapse of time $D_7/V$ (wherein $D_7$ is a medium-transporting distance from the photosensor 81 to the image recording region and V is a medium-transporting velocity) from a time when the photosensor 81 detected the red filter film Fr.

The electrostatic latent image reaches the image recording region after a lapse of time $D_8/V$ (wherein $D_8$ is a distance of movement of phtosensitive member surface between the image recording region and a region wherein the electrostatic latent image is formed on the phtosensitive member surface by the laser exposing device 43) from a time of initiation of the electrostatic latent image formation. As described above, the peripheral velocity (surface moving velocity) of the phtosensitive member is the same (V) as the medium-transporting velocity.

Consequently, in the case of $D_7>D_8$, if the laser exposing device initiates the formation of the electrostatic latent image corresponding to the sub-pixels superposed on the filter film after a lapse of time $(D_7-D_8)/V$ from a time when the filter film is detected by the photosensor 81, images can be recorded on the medium MD1 without displacement of position.

In the case of $D_7=D_8$, if the laser exposing device initiates the formation of the electrostatic latent image corresponding to the sub-pixels superposed on the filter film at the same time as when the filter film is detected by the photosensor 81, images can be recorded on the medium MD1 without displacement of position.

In the case of $D_7<D_8$, an image may be recorded on the medium MD1 without displacement of position, for example, on the following occasion: when the photosensor 81 detects the filter film Fr positioned on the most downstream side, the transport of the medium is temporarily stopped, and the transport of the medium is resumed after a lapse of time $(D_8-D_7)/V$ from a time when the laser exposing device initiates the formation of the electrostatic latent image corresponding to the sub-pixels superposed on the filter film.

<Image Display Medium MD11 and Image Recording Apparatus AP9 (See FIGS. 22 and 23)>

Figure 22:
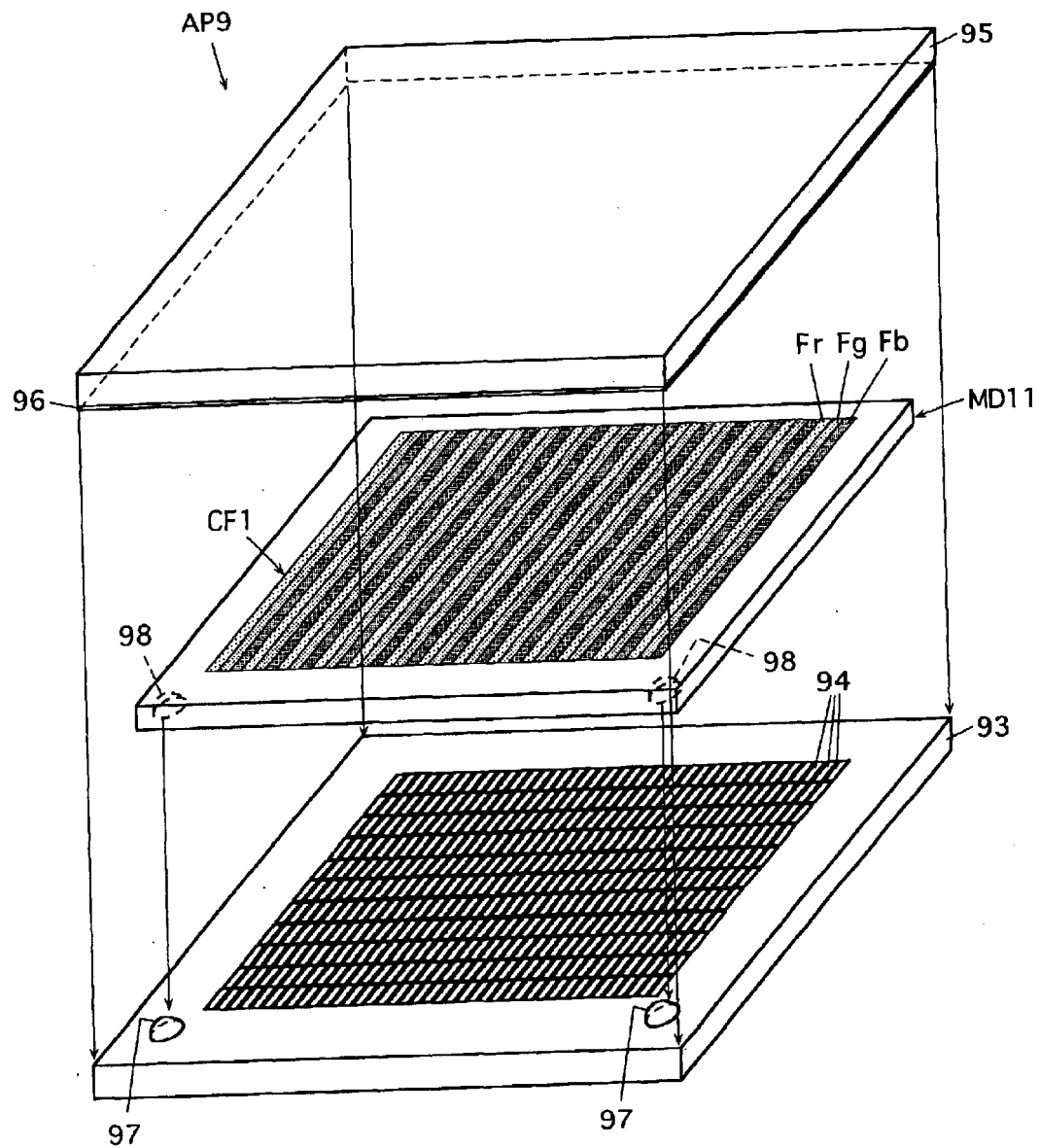
FIG. 22 is a schematic perspective view showing other examples of the image display medium and the image recording apparatus.

FIGS. 22 and 23 are a perspective view and a sectional view, respectively, schematically showing the structures of other examples of the image display medium and image recording apparatus.

An image display medium MD11 of FIGS. 22 and 23 is substantially the same as the image display medium MD1 of FIG. 2 except that concave portions 98 are formed on the substrate S2. Like parts having the same function are indicated by like reference symbols. The substrate S2 includes two concave portions 98 in a semispherical shape in section. The concave portions 98 are formed in positions which do not overlap the color filter CF1 on the substrate S1. The concave portions 98 have a specified positional relation with the filter films Fr, Fg, Fb of the color filter CF1.

The image recording apparatus AP9 of FIGS. 22 and 23 has a substrate 93 and a substrate 95. The substrate 93, i.e., one of them, has sub-pixel electrodes 94 corresponding to each sub-pixel. The substrate 93 has two convex portions 97 in a shape corresponding to the concave portions 98 of the medium MD11. The convex portions 97 have a specified positional relation with the sub-pixel electrodes 94. The other substrate 95 has a common electrode 96 to be brought face to face with all of the sub-pixel electrodes 94 in executing image recording.

In an image recording operation, the medium MD 11 is held between the substrates 93, 95 as shown in FIG. 23. In so doing, the concave portions 98 of the medium MD11 is brought into engagement with the convex portions 97 of the substrate 93 to position the medium MD11 with respect to the substrate 93. Each of the filter films Fr, Fg, Fb of the color filter CF1 and each of the sub-pixel electrodes 94 can be positioned to maintain a proper positional relation with each other by bringing the concave portions 98 having the specified positional relation with the filter films Fr, Fg, Fb into engagement with the convex portions 97 having the specified positional relation with sub-pixel electrodes 94. More specifically, each of the sub-pixel electrodes 94 is allowed to confront each of the sub-pixels superposed on the filter films Fr, Fg, Fb.

An electric field is applied to the display layer DL1 by applying a voltage between each of the sub-pixel electrodes 94 and the common electrode 96, whereby an image is recorded. To each sub-pixel electrode 94 is applied a voltage according to the image information of the sub-pixel to which the sub-pixel electrode is opposed. Since each sub-pixel electrode 94 is situated face to face with each sub-pixel superposed on each filter film without displacement of position, image recording can be executed without displacement of position, whereby a color image in the desired color can be formed.

The substrates 93, 95 may be openably connected to each other by hinges or otherwise. Convex portions may be formed on the medium MD11 and concave portions may be formed on the substrate 93, instead of forming concave portions on the medium MD11 and convex portions on the substrate 93.

Although the present invention has been described and illustrated in detail, it is clearly understood that the same is by way of illustration and example only and is not to be taken by way of limitation, the spirit and the scope of the present invention being limited only by the terms of the appended claims.

What is claimed is:

1. An image display medium comprising:
   a first transparent substrate disposed on an observation side;
   a second substrate disposed on a further side from the observation side than the first substrate;
   a display layer formed between the first substrate and the second substrate and including a plurality of developer particles;
   a plurality of partition walls arranged between the first substrate and the second substrate to partition the display layer into a plurality of sections; and
   a color filter, comprising at least one group of a plurality of light-transmitting filter films having different colors, positioned at the first substrate; wherein
   the distance between neighboring partition walls is greater than the width of any of the filter films, and at least two kinds of filters films are positioned between the neighboring partition walls.

2. An image display medium according to claim 1, wherein a the width of the a partition wall is smaller than the width of any of the filter films of the color filter.

3. An image display medium according to claim 2, wherein the filter films are arranged at a pitch independent of arrangement of the partition wall.

4. An image display medium according to claim 1, wherein the developer particles include those having a high light reflectance.

5. An image display medium according to claim 1, wherein the developer particles include light-interrupting particles.

6. An image display medium according to claim 1, wherein the first substrate serves also as the color filter.

7. An image display medium according to claim 1, wherein the developer particles are dry developer particles and wherein the display layer allows the dry particles to move in a space between the substrates for image display.

8. An image display medium according to claim I, wherein the display layer has a liquid between the substrates, and allows the developer particles to move in the liquid for image display.

9. An image display medium according to claim 1, wherein a positioning portion is provided in a specified positional relation with the filter films.

10. An image display medium according to claim 9, wherein the positioning portion comprises at least one concavity or convexity provided on the surface of the first substrate or the second substrate.

11. An image display medium according to claim 9, wherein the positioning portion comprises a float electrode provided on the surface of the first substrate or the second substrate.

12. An image display medium according to claim 1, wherein the display layer contains a darkly colored opaque liquid and brightly colored opaque particles between the substrates.

13. An image display medium comprising:
    a first transparent substrate disposed on an observation side;
    a second transparent substrate disposed on a further side from the observation side than the first substrate;
    a display layer formed between the first substrate and the second substrate and including a plurality of opaque developer particles;
    a transparent partition wall provided between the first substrate and the second substrate for partitioning the display layer into a plurality of sections; and
    a color filter, comprising at least one group of a plurality of light-transmitting filter films having different colors, positioned at the first substrate;
    wherein none of the filter films of the color filter overlaps the partition wall.

14. An image display medium comprising:
    a first transparent substrate disposed on an observation side;
    a second substrate disposed on a further side from the observation side than the first substrate;
    a display layer formed between the first substrate and the second substrate and including a dry developer which contains at least two kinds of dry developer particles having different chargeable polarities and different optical reflection densities;
    a partition wall provided between the first substrate and the second substrate for partitioning the display layer into a plurality of sections; and
    a color filter, comprising at least one group of a plurality of light-transmitting filter films having different colors, positioned at the first substrate;
    wherein the width of the partition wall is smaller than the width of any of the filter films, and wherein the filter films are arranged at a pitch independent of arrangement of the partition wall.

* * * * *